United States Patent
Abedini et al.

(10) Patent No.: US 12,413,371 B2
(45) Date of Patent: Sep. 9, 2025

(54) SIGNALING SUPPORT FOR DIFFERENT TIMING CASES IN IAB NODES

(71) Applicant: QUALCOMM Incorporated, San Diego, CA (US)

(72) Inventors: Navid Abedini, Basking Ridge, NJ (US); Luca Blessent, Whitehouse Station, NJ (US); Jianghong Luo, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 539 days.

(21) Appl. No.: 17/811,005

(22) Filed: Jul. 6, 2022

(65) Prior Publication Data

US 2023/0071894 A1    Mar. 9, 2023

Related U.S. Application Data

(60) Provisional application No. 63/236,663, filed on Aug. 24, 2021.

(51) Int. Cl.
| | |
|---|---|
| *H04L 5/00* | (2006.01) |
| *H04W 56/00* | (2009.01) |
| *H04W 88/08* | (2009.01) |
| *H04W 84/04* | (2009.01) |

(52) U.S. Cl.
CPC ......... *H04L 5/0078* (2013.01); *H04W 56/005* (2013.01); *H04W 88/085* (2013.01); *H04W 84/047* (2013.01)

(58) Field of Classification Search
CPC ............ H04L 5/0078; H04W 56/0015; H04W 56/004; H04W 84/047; H04W 88/085
See application file for complete search history.

(56) References Cited

U.S. PATENT DOCUMENTS

| 12,075,378 | B2* | 8/2024 | Song | H04W 56/0045 |
|---|---|---|---|---|
| 2021/0089495 | A1* | 3/2021 | Lemke | G06F 16/183 |
| 2021/0410058 | A1* | 12/2021 | Dey | H04W 40/24 |
| 2022/0070809 | A1* | 3/2022 | Song | H04W 72/20 |
| 2022/0110077 | A1* | 4/2022 | Abedini | H04W 56/0045 |

(Continued)

FOREIGN PATENT DOCUMENTS

| CA | 3223812 A1 * | 2/2023 | H04W 52/146 |
|---|---|---|---|
| CN | 100413351 C * | 8/2008 | H04L 65/1016 |
| GB | 2607486 A * | 12/2022 | H04B 1/692 |

OTHER PUBLICATIONS

Ericsson: "Timing, CLI and Power Control in Enhanced IAB", 3GPP TSG-RAN WG1 Meeting #104-e, R1-2101696, 3rd Generation Partnership Project, Mobile Competence Centre, 650, Route Des Lucioles, F-06921 Sophia-Antipolis Cedex, France, vol. RAN WG1, No. eMeeting, Jan. 25, 2021-Feb. 5, 2021, Jan. 18, 2021, XP051971849, 17 Pages, Paragraph [0002].

(Continued)

*Primary Examiner* — Khanh Q Dinh
(74) *Attorney, Agent, or Firm* — Procopio, Cory, Hargreaves & Savitch LLP

(57) ABSTRACT

An integrated access and backhaul (IAB) node receives, from a parent IAB node, a time difference parameter for over-the-air (OTA) synchronization in an IAB network. The IAB node adjusts transmission or reception of the IAB node based on the time difference parameter for one of multiple types of IAB node alignment.

28 Claims, 15 Drawing Sheets

(56) References Cited

U.S. PATENT DOCUMENTS

| | | | |
|---|---|---|---|
| 2022/0124652 A1* | 4/2022 | Wanuga | H04W 56/0015 |
| 2023/0050110 A1* | 2/2023 | Akkarakaran | H04W 56/0065 |
| 2023/0276389 A1* | 8/2023 | Ko | H04W 56/0005 370/350 |
| 2024/0080363 A1* | 3/2024 | Wang | H04L 67/12 |

OTHER PUBLICATIONS

International Search Report and Written Opinion—PCT/US2022/038908—ISA/EPO—Nov. 9, 2022.

Nokia, et al., "Other Enhancements for Simultaneous Operation of IAB-Node's Child and Parent Links", 3GPP TSG RAN WG1 #106-e, R1-2106829, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 6, 2021, 14 Pages, XP052033275, Paragraph [0002].

\* cited by examiner

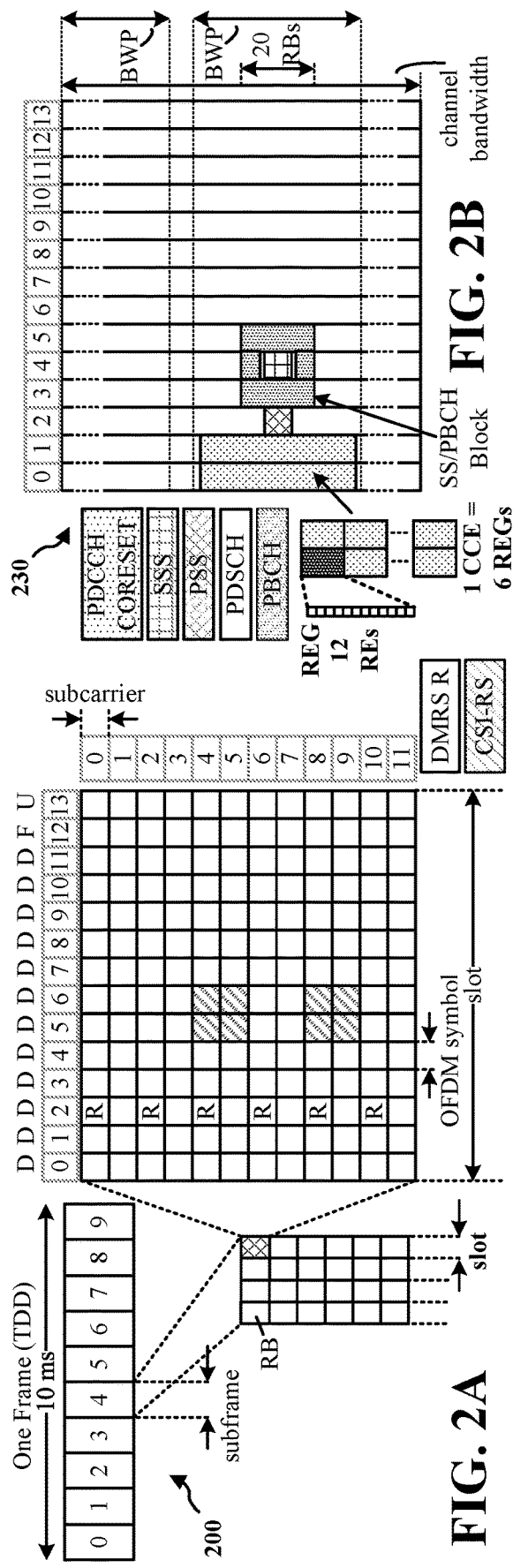
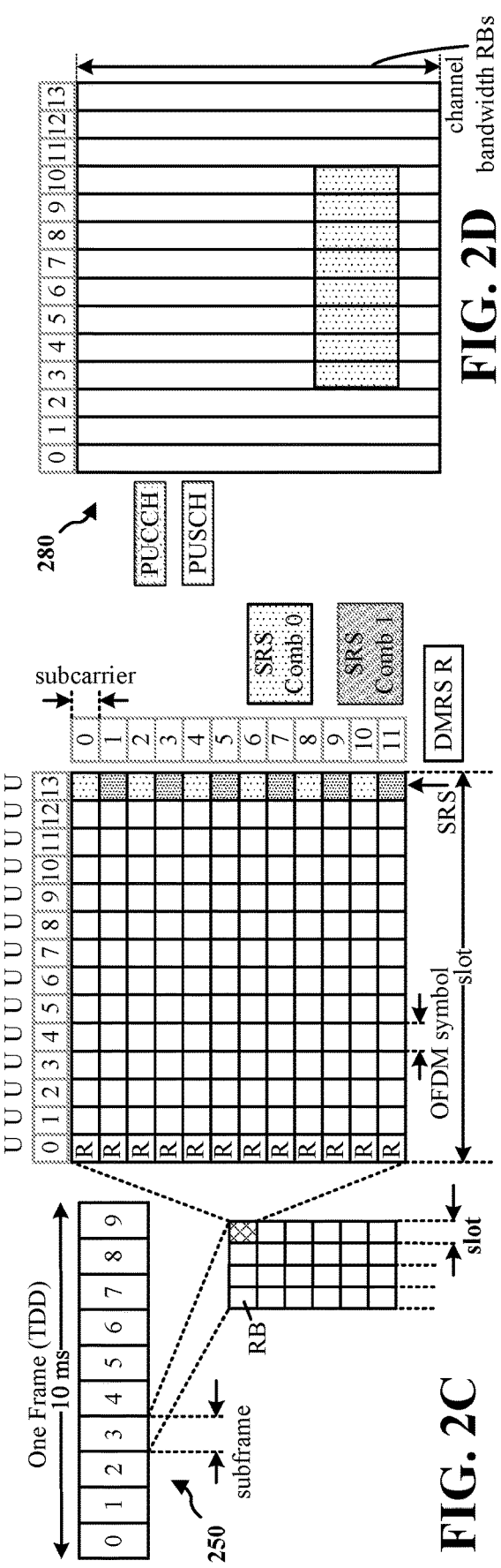
FIG. 2A  FIG. 2B  FIG. 2C  FIG. 2D

SIGNALING SUPPORT FOR DIFFERENT TIMING CASES IN IAB NODES

CROSS REFERENCE TO RELATED APPLICATION(S)

This application claims the benefit of and priority to U.S. Provisional Application Ser. No. 63/236,663, entitled "Signaling Support for Different Timing Cases in IAB Nodes" and filed on Aug. 24, 2021, which is expressly incorporated by reference herein in its entirety.

TECHNICAL FIELD

The present disclosure relates generally to communication systems, and more particularly, to communication in integrated access and backhaul (IAB) networks.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided at an integrated access and backhaul (IAB) node. The apparatus receives from a parent IAB node, a time difference parameter for over-the-air (OTA) synchronization in an IAB network and to adjust transmission or reception of the IAB node based on the time difference parameter for one of multiple types of IAB node alignment.

In an aspect of the disclosure, a method, a computer-readable medium, and an apparatus are provided at a parent IAB node. The apparatus transmits or receives communication with a IAB node that is a child node of a parent IAB node and transmits a time difference parameter for over-the-air synchronization in an IAB network, the time difference parameter being applicable for one of multiple types of IAB node alignment.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
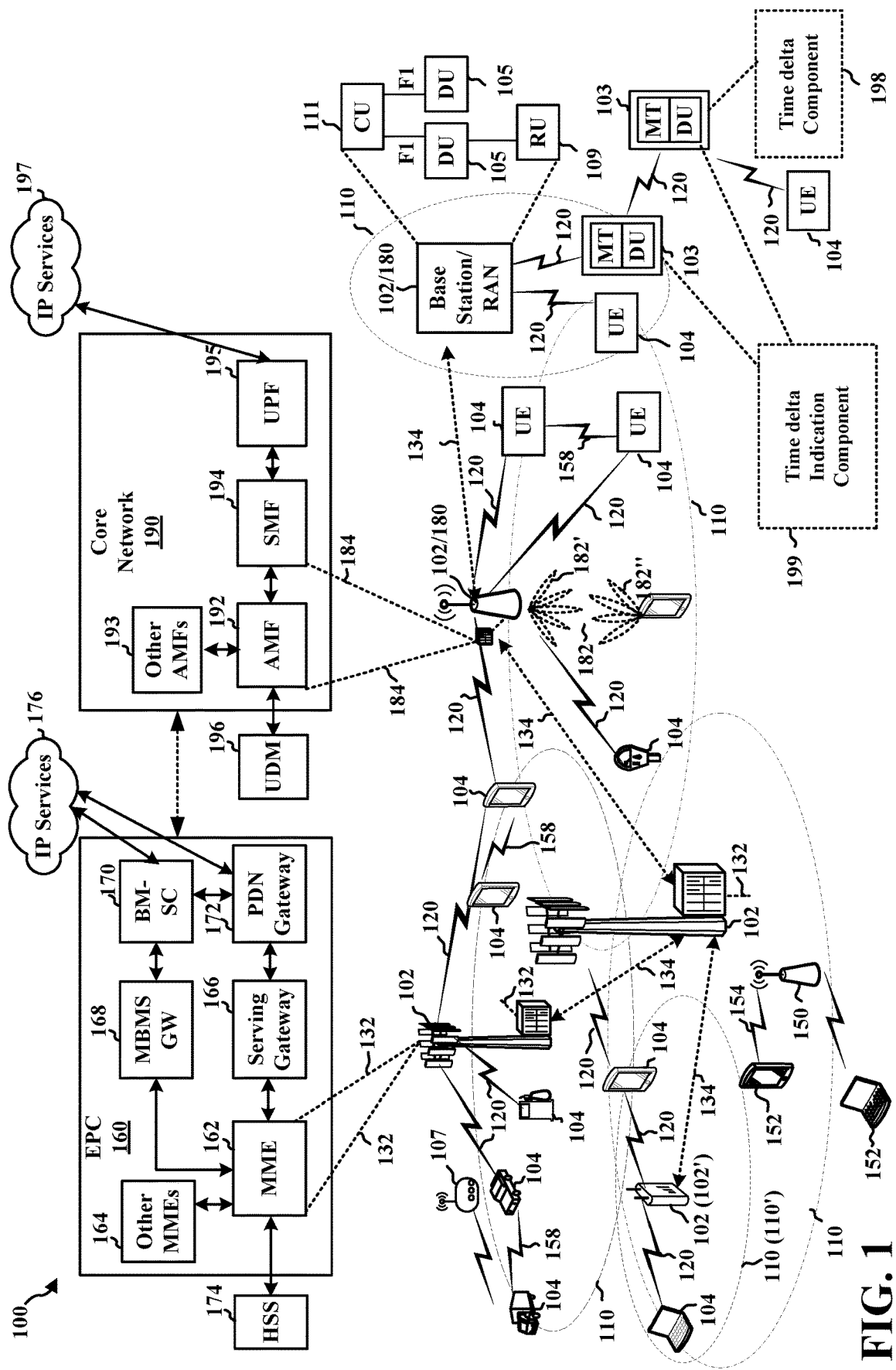
FIG. 1 is a diagram illustrating an example of a wireless communications system and an access network, in accordance with various aspects of the present disclosure.

The method may enable an IAB node to apply a time difference parameter for over-air-synchronization, e.g., $T_{delta}$ and/or $N_{delta}$, among multiple alignment types. For example, a time difference parameter for over-the-air (OTA) synchronization in an IAB network may be received from a parent IAB node, and the IAB node that receives the time difference parameter may adjust transmission or reception of the IAB node based on the time difference parameter for one of multiple types of alignment at the IAB node and/or the parent IAB node. The IAB node may apply the time difference parameter for one of multiple potential types of alignment at the IAB. A first type of alignment (e.g., which may be referred to as case 1 alignment) may include downlink transmission timing alignment across each IAB node of the IAB network. A second type of alignment (e.g., which may be referred to as case 6 alignment) may be between uplink transmission at an IAB mobile termination (IAB-MT) of the child IAB node and downlink transmission at an IAB distributed unit (IAB-DU) of the child IAB node. A third type of alignment (e.g., which may be referred to as case 7 alignment) may be between downlink reception at the IAB-MT of the child IAB node and uplink reception at the IAB-DU of the child IAB node.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communication system and access network 100 may include an integrated access and backhaul (IAB) network that includes multiple cells in communication with each other to provide an access network and a backhaul network to a core network such as core network 190 or Evolved Packet Core (EPC) 160. The core network 190 may be a 5G Core (5GC) a core network that supports new radio (NR) communication or another type of core network. The IAB network may include one or more IAB nodes 103. The IAB nodes may exchange communication with other IAB nodes 103, with a base station 102 or 180, and/or with UEs 104.

In some aspects, an IAB Node 103 may include a time delta component 198 and/or a time delta indication component 199. The time delta component 198 may be configured to receive from a parent IAB node, a time difference parameter for over-the-air (OTA) synchronization in an IAB network and to adjust transmission or reception of the IAB node based on the time difference parameter for one of multiple types of alignment at the IAB node and/or the parent IAB node. The time delta indication component may be configured to transmit, e.g., to a child IAB node, a time difference parameter for OTA synchronization in an IAB network, the time difference parameter being applicable for one of multiple types of alignment at the child IAB node and/or the IAB node. A first type of alignment (e.g., which may be referred to as case 1 alignment) may include downlink transmission timing alignment across each IAB node of the IAB network. A second type of alignment (e.g., which may be referred to as case 6 alignment) may be between uplink transmission at an IAB mobile termination (IAB-MT) of the child IAB node and downlink transmission at an IAB distributed unit (IAB-DU) of the child IAB node. A third type of alignment (e.g., which may be referred to as case 7 alignment) may be between downlink reception at the IAB-MT of the child IAB node and uplink reception at the IAB-DU of the child IAB node. In some aspects, an IAB node may include both a time delta component 198 and/or a time delta indication component 199, because the IAB node may perform some aspects of wireless communication as a parent IAB node and may perform other aspects as a child IAB node, e.g., the IAB node may have a parent IAB node and a child IAB node. Although examples in the following description may be focused on 5G NR, the concepts described herein may be applicable to other similar areas, such as LTE, LTE-A, CDMA, GSM, and other wireless technologies.

The wireless communications system (also referred to as a wireless wide area network (WWAN)). The base stations 102 illustrated in FIG. 1 may support macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 111, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 111, the DU 105, and the RU 109. A RAN may be disaggregated with a split between the CU 111 and an aggregated DU/RU. The CU 111 and the one or more DUs 105 may be connected via an F1 interface. A DU 105 and an RU 109 may be connected via a fronthaul interface. A connection between the CU 111 and a DU 105 may be referred to as a midhaul, and a connection between a DU 105 and an RU 109 may be referred to as a fronthaul. The connection between the CU 111 and the core network may be referred to as the backhaul. The RAN may be based on a functional split between various components of the RAN, e.g., between the CU 111, the DU 105, or the RU 109. The CU 111 may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU 111 and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 111 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 103 that exchange wireless communication with a UE 104 or other IAB node 103 to provide access and backhaul to a core network, e.g., as described in more detail in connection with FIGS. 4-6. In an IAB network of multiple IAB nodes, an anchor node may be referred to as an IAB donor. The IAB donor may be a base station 102 or 180 that provides access to a core network 190 or EPC 160 and/or control to one or more IAB nodes 103.

The IAB donor may include a CU 111 and a DU 105. IAB nodes 103 may include a DU 105 and a mobile termination (MT). The DU 105 of an IAB node 103 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in mmW frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a mmW waves. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a IAB let, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 15:
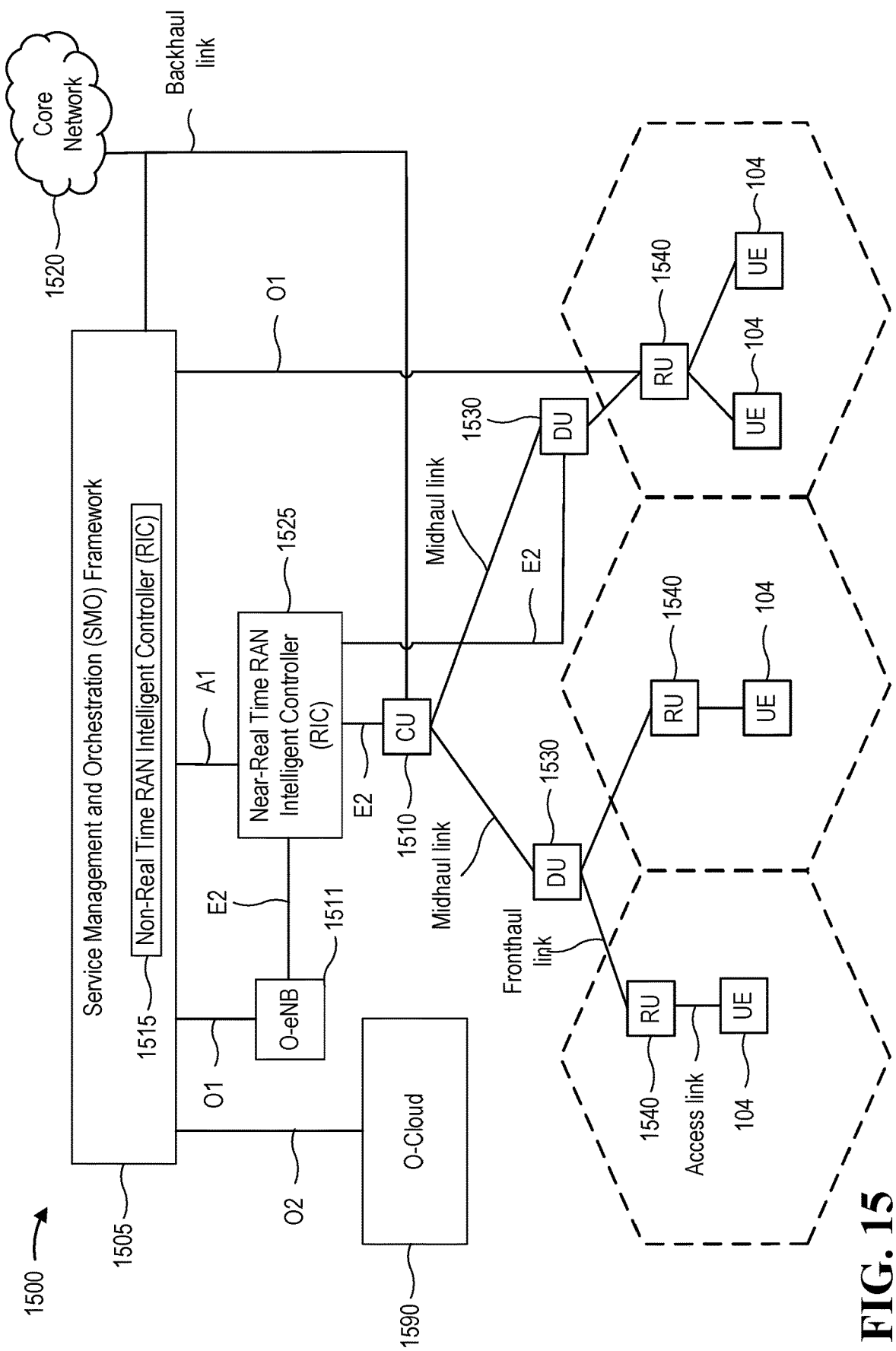
FIG. 15 shows a diagram illustrating an example disaggregated base station architecture.

FIG. 15 shows a diagram illustrating an example disaggregated base station 1500 architecture. The disaggregated base station 1500 architecture may include one or more central units (CUs) 1510 that can communicate directly with a core network 1520 via a backhaul link, or indirectly with the core network 1520 through one or more disaggregated base station units (such as a Near-Real Time (Near-RT) RAN Intelligent Controller (RIC) 1525 via an E2 link, or a Non-Real Time (Non-RT) RIC 1515 associated with a Service Management and Orchestration (SMO) Framework 1505, or both). A CU 1510 may communicate with one or more distributed units (DUs) 1530 via respective midhaul links, such as an F1 interface. The DUs 1530 may communicate with one or more radio units (RUs) 1540 via respective fronthaul links. The RUs 1540 may communicate with respective UE 104 via one or more radio frequency (RF) access links. In some implementations, the UE 104 may be simultaneously served by multiple RUs 1540.

Each of the units, i.e., the CUs 1510, the DUs 1530, the RUs 1540, as well as the Near-RT RICs 1525, the Non-RT RICs 1515 and the SMO Framework 1505, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 1510 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1510. The CU 1510 may be configured to handle user plane functionality (i.e., Central Unit-User Plane (CU-UP)), control plane functionality (i.e., Central Unit-Control Plane (CU-CP)), or a combination thereof. In some implementations, the CU 1510 can be logically split into one or more CU-UP units and one or more CU-CP units. The CU-UP unit can communicate bidirectionally with the CU-CP unit via an interface, such as the E1 interface when implemented in an O-RAN configuration. The CU 1510 can be implemented to communicate with the DU 1530, as necessary, for network control and signaling.

The DU 1530 may correspond to a logical unit that includes one or more base station functions to control the operation of one or more RUs 1540. In some aspects, the DU 1530 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 1530 may further host one or more low PHY layers. Each layer (or module) can be implemented with an interface configured to communicate signals with other layers (and modules) hosted by the DU 1530, or with the control functions hosted by the CU 1510.

Lower-layer functionality can be implemented by one or more RUs 1540. In some deployments, an RU 1540, controlled by a DU 1530, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1540 can be implemented to handle over the air (OTA) communication with one or more UEs 104. In some implementations, real-time and non-real-time aspects of control and user plane communication with the RU(s) 1540 can be controlled by the corresponding DU 1530. In some scenarios, this configuration can enable the DU(s) 1530 and the CU 1510 to be implemented in a cloud-based RAN architecture, such as a vRAN architecture.

The SMO Framework 1505 may be configured to support RAN deployment and provisioning of non-virtualized and virtualized network elements. For non-virtualized network elements, the SMO Framework 1505 may be configured to support the deployment of dedicated physical resources for RAN coverage requirements which may be managed via an operations and maintenance interface (such as an O1 interface). For virtualized network elements, the SMO Framework 1505 may be configured to interact with a cloud computing platform (such as an open cloud (O-Cloud) 1590) to perform network element life cycle management (such as to instantiate virtualized network elements) via a cloud computing platform interface (such as an O2 interface). Such virtualized network elements can include, but are not limited to, CUs 1510, DUs 1530, RUs 1540 and Near-RT RICs 1525. In some implementations, the SMO Framework 1505 can communicate with a hardware aspect of a 4G RAN, such as an open eNB (O-eNB) 1511, via an O1 interface. Additionally, in some implementations, the SMO Framework 1505 can communicate directly with one or more RUs 1540 via an O1 interface. The SMO Framework 1505 also may include a Non-RT RIC 1515 configured to support functionality of the SMO Framework 1505.

The Non-RT RIC 1515 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1525. The Non-RT RIC 1515 may be coupled to or communicate with (such as via an A1 interface) the Near-RT RIC 1525. The Near-RT RIC 1525 may be configured to include a logical function that enables near-real-time control and optimization of RAN elements and resources via data collection and actions over an interface (such as via an E2 interface) connecting one or more CUs 1510, one or more DUs 1530, or both, as well as an O-eNB, with the Near-RT RIC 1525.

In some implementations, to generate AI/ML models to be deployed in the Near-RT RIC 1525, the Non-RT RIC 1515 may receive parameters or external enrichment information from external servers. Such information may be utilized by the Near-RT RIC 1525 and may be received at the SMO Framework 1505 or the Non-RT RIC 1515 from non-network data sources or from network functions. In some examples, the Non-RT RIC 1515 or the Near-RT RIC 1525 may be configured to tune RAN behavior or performance. For example, the Non-RT RIC 1515 may monitor long-term trends and patterns for performance and employ AI/ML models to perform corrective actions through the SMO Framework 1505 (such as reconfiguration via O1) or via creation of RAN management policies (such as A1 policies).

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
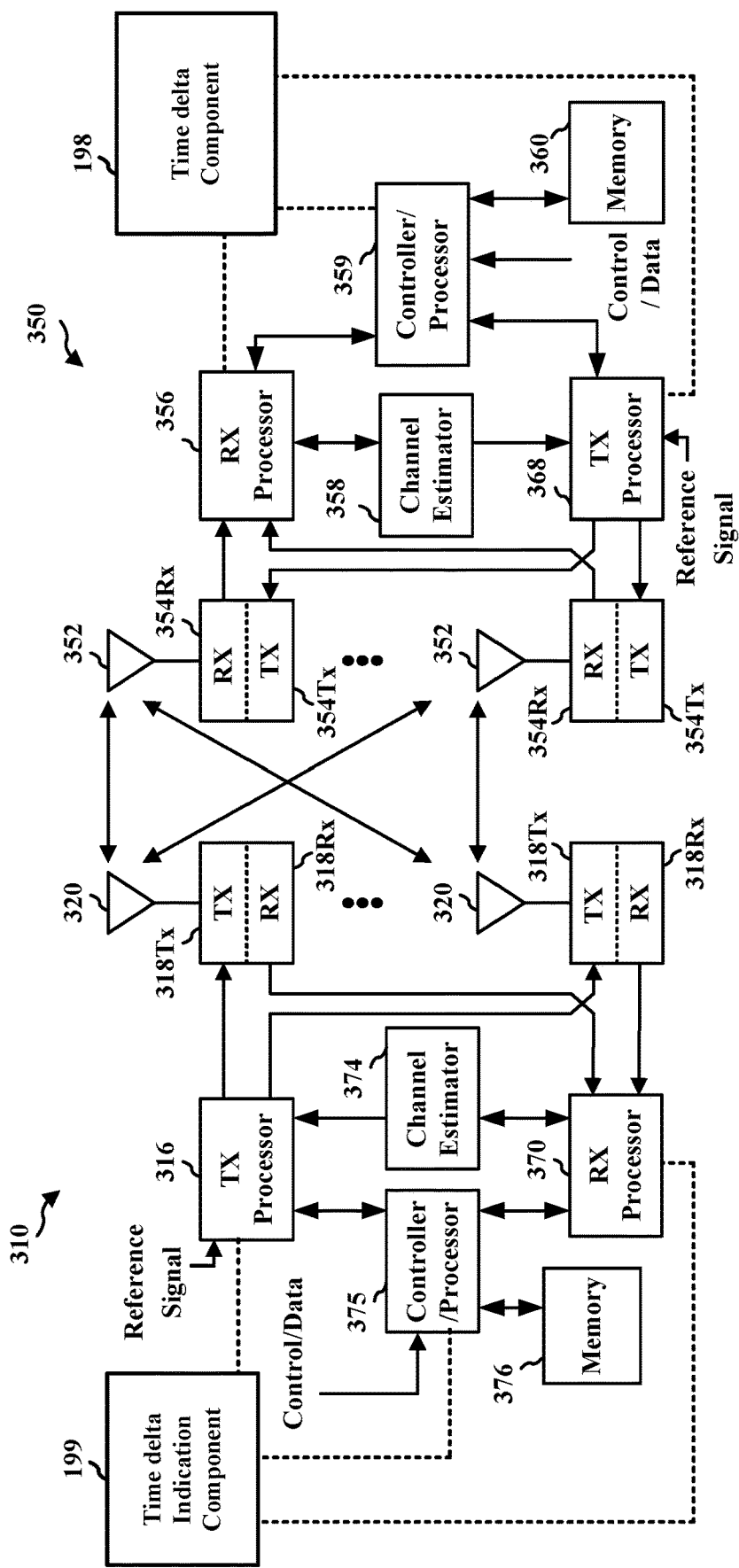
FIG. 3 is a diagram illustrating an example of an IAB node and user equipment (UE) in a network, in accordance with various aspects of the present disclosure.

FIG. 3 is a block diagram of an IAB node 310 in communication with a UE 350 in an access network. In the DL, IP packets from the EPC 160 or core network 190 may be provided to a controller/processor 375. The controller/processor 375 implements layer 3 and/or layer 2 functionality. Layer 3 includes a radio resource control (RRC) layer, and may be performed if the IAB node is a donor IAB node. Layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate an RF carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the IAB node 310. These soft decisions may be based on channel estimates computed by the channel estimator 358. The soft decisions are then decoded and deinterleaved to recover the data and control signals that were originally transmitted by the IAB node 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the IAB node 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the IAB node 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the IAB node 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160 or core network 190, e.g., via a donor IAB node if the IAB node is not a donor IAB node. The controller/processor 375 is also responsible for error detection using an ACK and/or NACK protocol to support HARQ operations.

At least one of the TX processor 368, the RX processor 356, and the controller/processor 359 may be configured to perform aspects in connection with a time delta component 198 and/or a time delta indication component 199, e.g., as described in connection with FIG. 1.

At least one of the TX processor 316, the RX processor 370, and the controller/processor 375 may be configured to perform aspects in connection with a time delta component 198 and/or a time delta indication component 199, e.g., as described in connection with FIG. 1.

Figure 4:
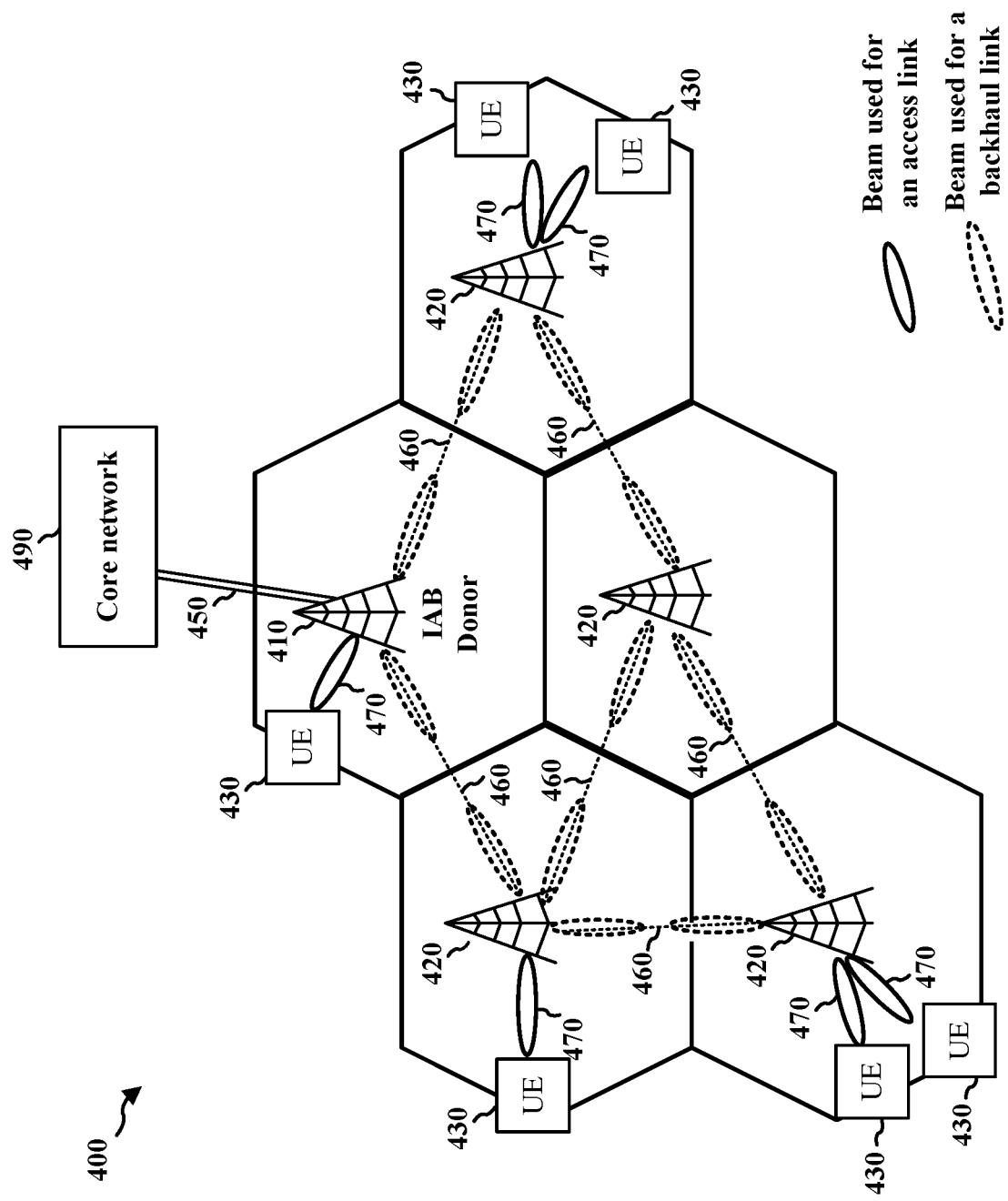
FIG. 4 is a diagram illustrating an example IAB network, in accordance with various aspects of the present disclosure.

FIG. 4 is a diagram illustrating an IAB network 400. The IAB network provides access network functionality between access nodes (ANs) and other ANs/UEs, and backhaul network functionality between ANs. The ANs include IAB-donors, which have a wireline connection to the core network, and IAB nodes, which operate wirelessly and relay traffic to/from IAB-donors through one or more AN hops. The IAB ANs share resources between the access and backhaul. That is, the resources used for access communication between the ANs and ANs/UEs are also used for backhaul communication between the ANs.

The IAB network 400 may include an anchor node (that may be referred to herein as an "IAB donor") 410 and access nodes (that may be referred to herein as "IAB nodes") 420. The IAB donor 410 may be a base station, such as a gNB or eNB, and may perform functions to control the IAB network 400. The IAB nodes 420 may comprise L2 relay nodes, etc. Together, the IAB donor 410 and the IAB nodes 420 share resources to provide an access network and a backhaul network to core network 490. For example, resources may be shared between access links and backhaul links in the IAB network.

UEs 430 interface with the IAB nodes 420 or the IAB donor 410 through access links 470. The IAB nodes 420 communicate with each other and with the IAB donor 410 through backhaul links 460. The IAB donor 410 is connected to the core network 490 via a wireline backhaul link 450. UEs 430 communicate with the core network by relaying messages through their respective access link 470 to the IAB node 420, which then may relay the message through backhaul links 460 to the IAB donor 410 to communicate to the core network through the wireline backhaul link 450. Similarly, the core network may communicate with a UE 430 by sending a message to the IAB donor 410 through the wireline backhaul link 450. The IAB donor 410 sends the message through the IAB network 400 via backhaul links 460 to the IAB node 420 connected to the UE 430, and the IAB node 420 sends the message to the UE 430 via the access link 470.

Each IAB node, e.g., including IAB donor 410 and each IAB node 420, may use a PCI value. The PCI value may serve as an identifier for that IAB donor 410 or IAB node 420. The PCI value may be used to determine a scrambling sequence that is applied to physical signals and/or channels that are transmitted by a particular IAB node. For example, a PSS and/or the SSS transmitted by the respective IAB donor 410 or IAB node 420 may be scrambled using a scrambling sequence that is based on the PCI used by the respective IAB node.

Figure 5:
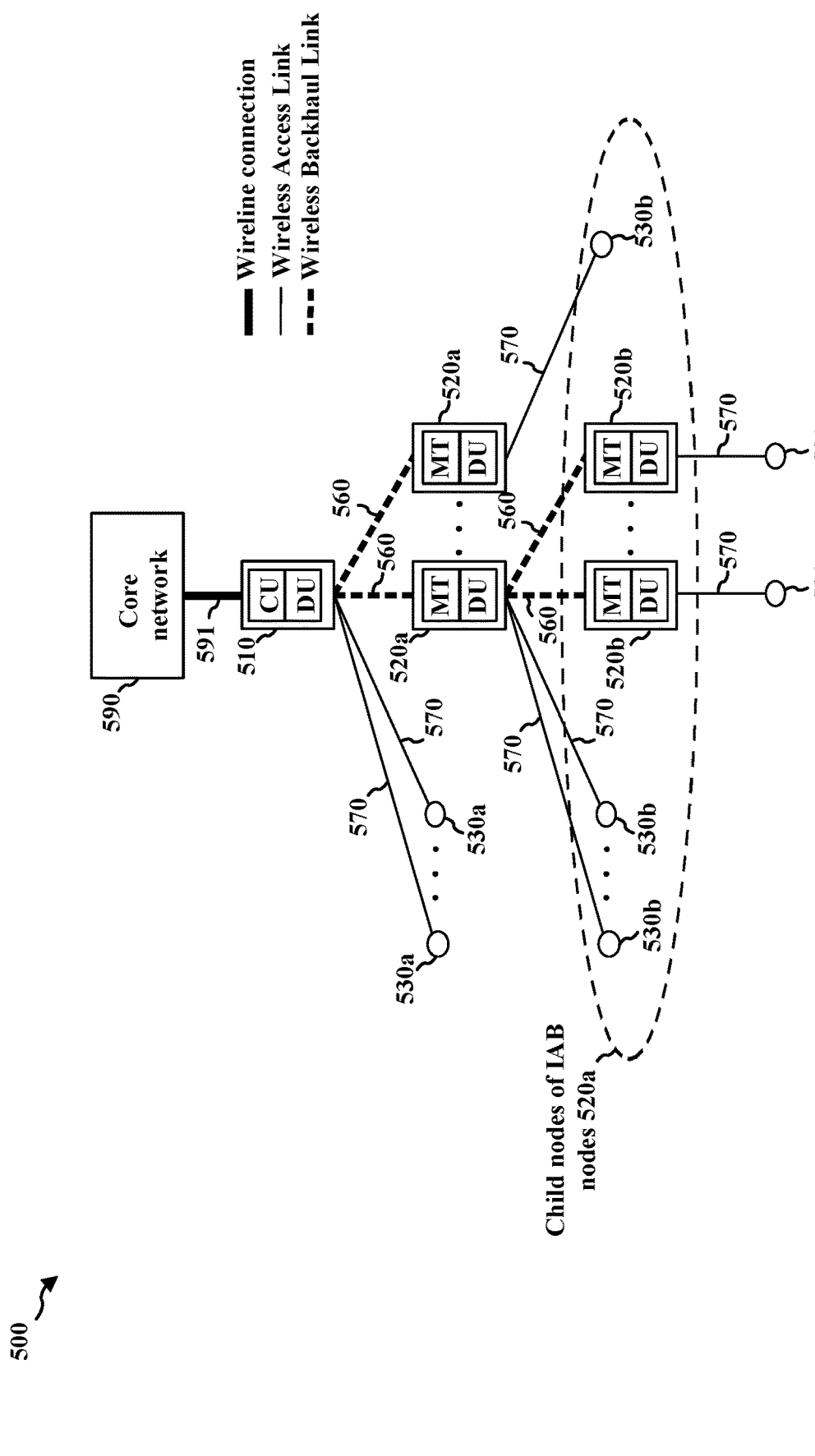
FIG. 5 is a diagram illustrating an example IAB network and components thereof, in accordance with various aspects of the present disclosure.

FIG. 5 illustrates a second diagram illustrating an IAB network 500 and components thereof. The IAB network 500 includes an IAB donor 510 and IAB nodes 520a and 520b. The IAB nodes, as well as the IAB donor, may provide wireless access links to UEs 530a, 530b, 530c.

The IAB donor 510 may be considered a root node of the tree structure of the IAB network 500. The IAB donor node 510 may be connected to the core network 590 via a wired connection 591. The wired connection may comprise, e.g., a wireline fiber. The IAB donor node 510 may provide a connection to one or more IAB nodes 520a. The IAB nodes 520a may each be referred to as a child node of the IAB donor node 510. The IAB donor node 510 may also provide a connection to one or more UE 530a, which may be referred to as a child UE of IAB donor 510. The IAB donor 510 may be connected to its child IAB nodes 520a via backhaul links 560, and may be connected to the child UEs 530a via access links 570. The IAB nodes 520a that are children nodes of IAB node 510 may also have IAB node(s) 520b and/or UE(s) 530b as children. For example, IAB nodes 520b may further connect to child nodes and/or child UEs. FIG. 5 illustrates IAB nodes 520b providing an access link to UEs 530c, respectively.

The IAB donor 510 may include a central unit (CU) and a distributed unit (DU). The central unit CU may provide control for the IAB nodes 520a, 520b in the IAB network 500. For example, the CU may control the IAB network 500 through configuration. The CU may perform RRC/PDCP layer functions. The IAB donors 510 further include a DU that performs scheduling. For example, the DU may schedule resources for communication by the child IAB nodes 520a and/or UEs 530a of the IAB donor 510. The DU holds radio link control (RLC), media access control (MAC), a physical (PHY) layer functions.

The IAB nodes 520a, 520b may include a mobile termination (MT) and a DU. The IAB node is an L2 relay node. The MT of IAB node 520a may operate as a scheduled node, scheduled similar to a UE 530a by the DU of the parent node, e.g., IAB donor 510. The MT of IAB node 520b may operate as a scheduled node of parent node 520a. The DU may schedule the child IAB nodes 520b and UEs 530b of the IAB node 520a. As an IAB node may provide a connection to an IAB node that in turn provides a connection for another IAB node. The pattern of a parent IAB node comprising a DU that schedules a child IAB node/child UE may continue to more connections that illustrated in FIG. 5.

Figure 6:
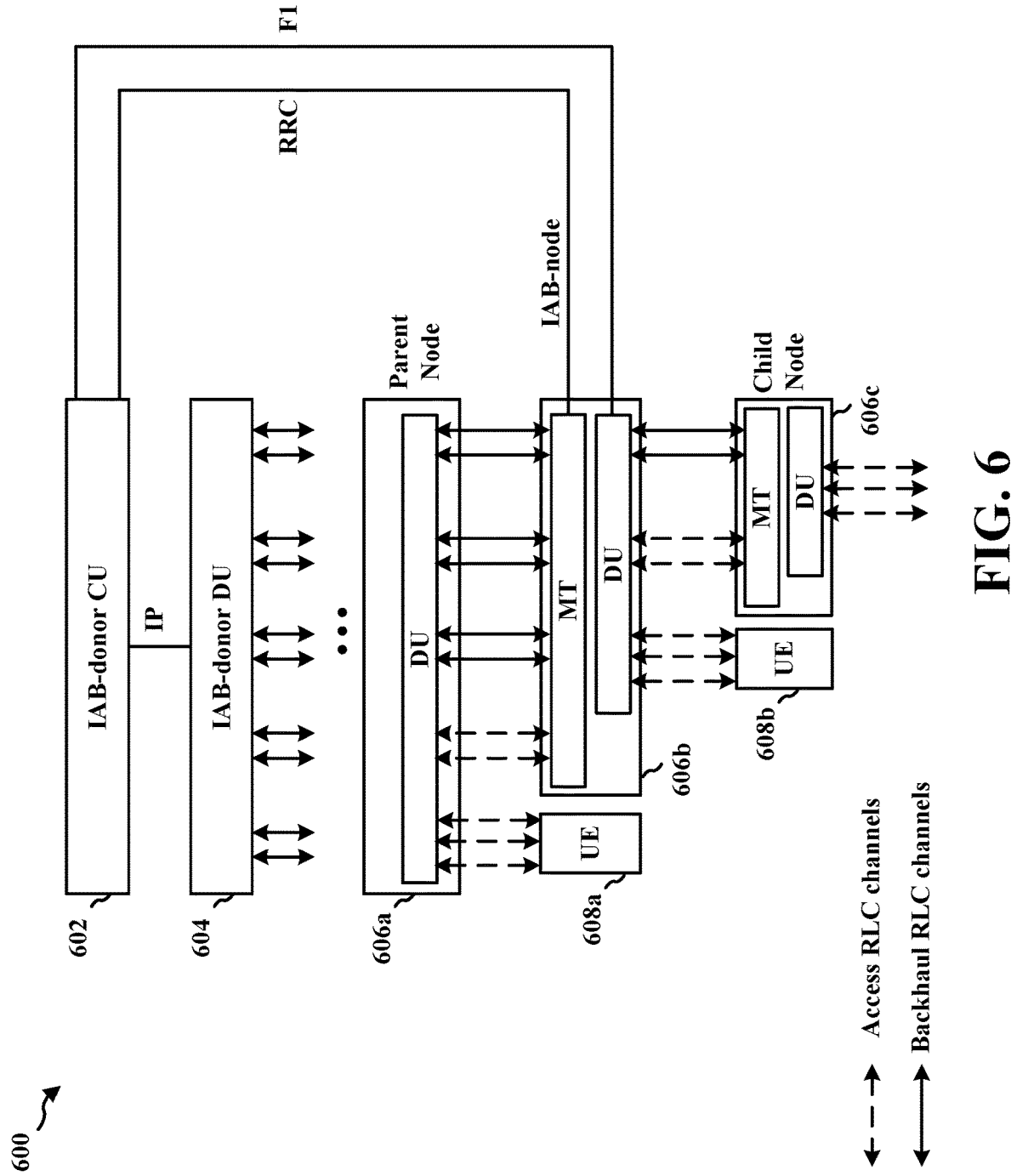
FIG. 6 is a diagram illustrating an example connections for an IAB network, in accordance with various aspects of the present disclosure.

FIG. 6 is a diagram 600 illustrating RLC channels in an IAB network. As discussed supra, the IAB network provides both access network functionality and backhaul network functionality. The IAB network includes an IAB donor with a CU 602 and DU 604 Per the access network functionality, IAB ANs 606a, 606b, and 606c may communicate with other UEs 608a and 608b and/or MTs of other IAB ANs through access RLC channels. Per the backhaul network functionality, IAB ANs 606a, 606b, and 606c may route traffic to other ANs (e.g., 606a, 606b, and 606c) through backhaul RLC channels. Access RLC channels include UE-to-DU/DU-to-UE, carrying PDCP for RRC or data radio bearers (DRBs), and MT-to-DU/DU-to-MT, carrying PDCP for RRC (or DRBs). Backhaul RLC channels include MT-to-DU/DU-to-MT, carrying backhaul adaptation protocol (BAP) messages for backhauling access traffic.

Figure 7:
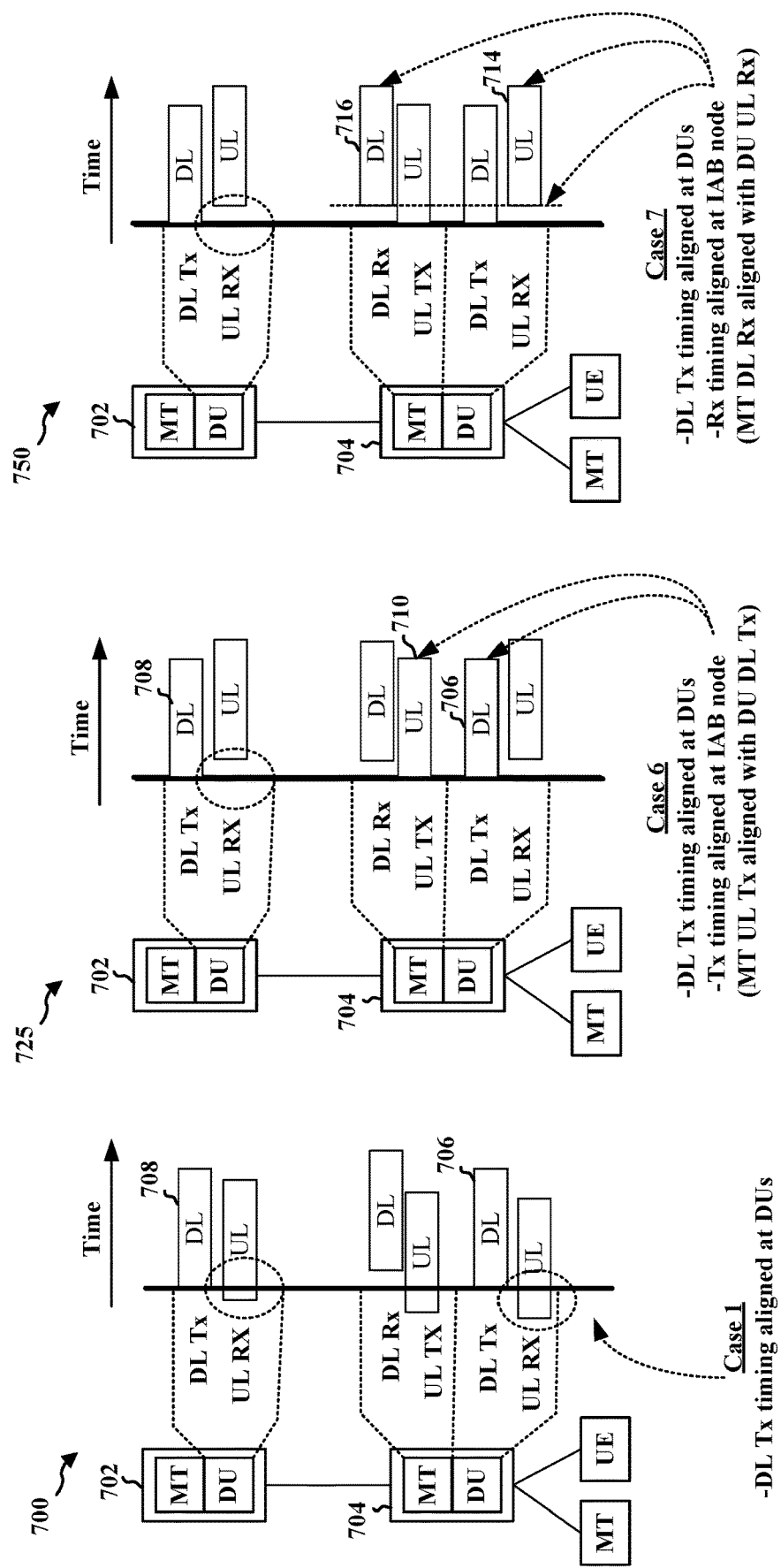
FIGS. 7A, 7B, and 7C illustrate various examples of different types of timing alignment for IAB nodes, in accordance with various aspects of the present disclosure.

FIGS. 7A, 7B, and 7C illustrate example aspects of different timing modes for IAB communication. FIG. 7A illustrates a timing example 700 of downlink transmission timing alignment across IAB nodes 702 and 704. In some aspects, the downlink transmission timing may be aligned across each IAB node in an IAB network. The downlink transmission timing alignment may be referred to as "case 1" alignment or may be called by another name. FIG. 7A illustrates that DL transmission 708 by the DU of the IAB node 702 is aligned in time with the DL transmission 706 from the DU of the IAB node 704. An uplink timing adjustment framework may be applied, in which a child IAB node (e.g., IAB node 704) receives an uplink timing adjustment from a parent IAB node to apply for uplink transmissions to the parent IAB node (e.g., IAB node 702). FIGS. 7B and 7C illustrate time diagrams 725 and 750, respectively that illustrate aspects of additional timing modes that may be used, e.g., for providing or improving a duplexing capability between an IAB-MT and an IAB DU of an IAB node. The additional timing modes may provide improved timing alignment between the MT and DU of an IAB node for spatial division multiplexing, e.g., when the IAB node performs simultaneous, e.g., overlapping at least partially in time and/or frequency, IAB-MT downlink reception in one direction and IAB-DU uplink reception in another direction and/or performs IAB-MT uplink transmission in one direction and IAB-DU downlink transmission in another direction.

FIG. 7B illustrates an example time diagram 725 showing a mode or type of timing alignment that aligns uplink transmission timing of the IAB-MT of the IAB node (e.g., the IAB node 704) with the downlink transmission timing of the IAB-DU of the IAB node, e.g., which facilitates simultaneous (e.g., overlapping at least partially in time) transmissions at the IAB node (e.g., the IAB node 704) by the IAB-MT (e.g., UL transmission 710) and the IAB-DU (e.g., DL transmission 706). The mode of alignment in FIG. 7B with the transmission alignment among the MT and DU of the IAB node may be referred to as "case 6" alignment or may be called by another name. The timing alignment, as shown in FIG. 7B, may further include the downlink transmission timing alignment across IAB nodes (e.g., case 1 alignment) as described in connection with FIG. 7A.

FIG. 7C illustrates an example time diagram 750 showing a mode or type of timing alignment that aligns downlink reception timing of the IAB-MT of the IAB node (e.g., the IAB node 704) with the uplink reception timing of the IAB-DU of the IAB node, e.g., which facilitates simultaneous (e.g., overlapping at least partially in time) reception at the IAB node (e.g., the IAB node 704) by the IAB-MT (e.g., DL reception 716) and the IAB-DU (e.g., UL reception 714). The mode of alignment in FIG. 7C with the reception alignment among the MT and DU of the IAB node may be referred to as "case 7" alignment or may be called by another name. The timing alignment, as shown in FIG. 7C, may further include the downlink transmission timing alignment across IAB nodes (e.g., case 1 alignment) as described in connection with FIG. 7A.

For an alignment mode that aligns transmissions of the MT and DU of an IAB node (e.g., case 6), the timing at a given IAB node may include the IAB-MT transmission timing being set by the IAB node to the timing obtained for the node's downlink transmission. For an alignment mode that aligns reception of the MT and DU of an IAB node (e.g., case 7), the timing at a parent IAB node (e.g., in contrast to the given IAB node for the transmission alignment mode) may include the IAB-MT transmission timing being obtained based on a timing advance loop plus an offset from a parent IAB node. Aspects presented herein provide for the timing alignment that also supports OTA synchronizations among IAB nodes.

OTA synchronization provides a mechanism for an IAB node to set its downlink transmission timing based on OTA signals received from one or more parent IAB node. OTA synchronization enables the IAB nodes of an IAB network to synchronize with each other, e.g., in order to provide the DL transmission alignment across IAB nodes described in connection with FIG. 7A, separate from an independent synchronization source such as a global navigation satellite system (GNSS). OTA synchronization is based on a timing advance (TA) control for uplink transmission and an extra offset ($T_{delta}$) that is indicated by a parent IAB node. The parent IAB node may indicate the TA and $T_{delta}$ to the child IAB node in a MAC-CE in some examples, e.g., to the child IAB node's MT.

Figure 8:
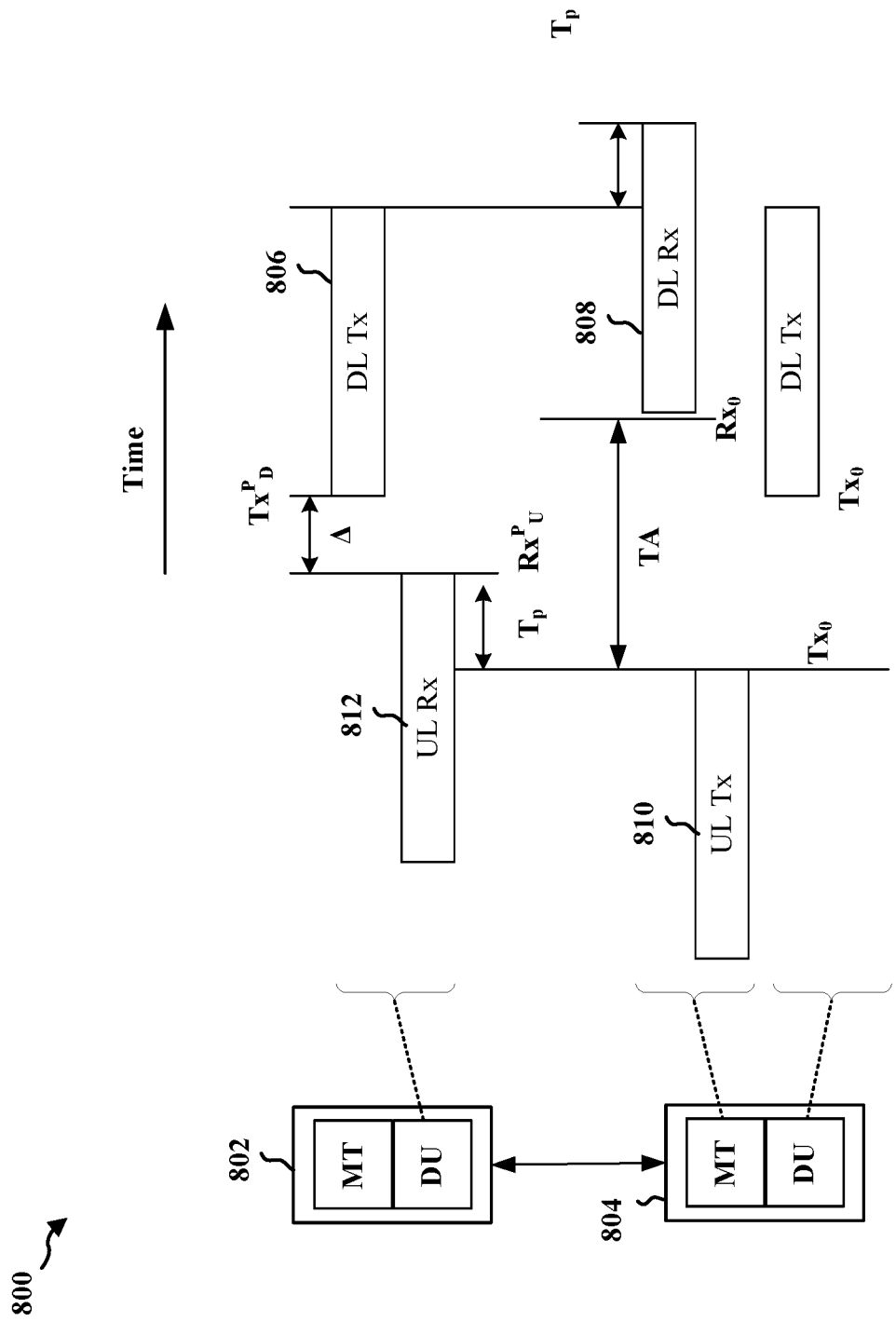
FIG. 8 illustrates a timing diagram for communication with a parent IAB node and a child IAB node, in accordance with various aspects of the present disclosure.

FIG. 8 illustrates an example time diagram 800 that shows timing differences between uplink transmission at a child IAB node 804 and uplink reception at a parent IAB node relative to downlink transmission timing at the parent IAB node. The difference between the uplink reception and the downlink transmission corresponds to delta ($\Delta$). As the parent IAB node 802 and the child IAB node 804 operate in timing alignment between downlink transmissions from the DU of each IAB node, the transmission times are aligned with $Tx_D = Tx^P_D$, in which the transmission time of the DU of the IAB node 804 is $Tx_D$ and the transmission time of the DU of the parent IAB node is $Tx^P_D$. The timing advance may correspond to TA=2 Tp+$\Delta$ and $\Delta$=TA−2Tp, in which Tp corresponds to a propagation time between the parent IAB node 802 and the child IAB node 804, as shown for the difference between the time that the DL TX 806 ends and the reception DL RX 808 at the IAB node 804 ends for the corresponding transmission from the parent IAB node 802. The same propagation time is shown between the end of the uplink transmission 810 from the IAB node 804 and the end of reception 812 of the corresponding uplink transmission at the parent IAB node 802. In this example, the $Tx_D=Rx_D-Tp=Rx_D-(TA-\Delta)/2$, where $Rx_D$ correspond to downlink reception at the DU of the IAB node 804. As well, $Tp=TA/2+T_{delta}$ so that $T_{delta}=-\Delta/2=(Rx^P_U-Tx^P_D)/2$, where $Rx^P_U$ corresponds to uplink reception time at the parent IAB node 802 (e.g., 812).

As well, If an IAB node is provided an index $T_{delta}$ in a Timing Delta MAC CE from a serving cell, the IAB node may assume that $(N_{TA}/2+N_{delta}+T_{delta} \cdot G_{step}) \cdot T_c$, is a time difference between a DU transmission of a signal from the serving cell and a reception of the signal by the IAB-MT when $N_{TA}/2+N_{delta}+T_{delta} \cdot G_{step}>0$. $N_{TA}$ may obtained in a similar manner as for a UE in a TAG containing the serving cell. $N_{delta}$ and $G_{step}$ may be determined as:

$N_{delta}=-70528$ and $G_{step}=64$, if the serving cell providing the Timing Delta MAC CE operates in FR1, $N_{delta}=-17664$ and $G_{step}=32$, if the serving cell providing the Timing Delta MAC CE operates in FR2

The IAB node may use the time difference to determine a DU transmission time.

If an IAB node is operating based on transmission timing alignment between the MT and DU of the IAB node, e.g., as described in connection with FIG. 7B (e.g., case 6), the IAB-MT sets its own uplink transmission timing to be aligned with the downlink transmission timing of the IAB node's DU (e.g., which may be referred to as a co-located DU that is co-located with the MT of the IAB node). In this example, there is no uplink timing advance, as the parent IAB node does not control the uplink transmission timing of the child IAB-MT and does not send a TA command. Without the closed-loop feedback in a TA command from the parent IAB node, the child IAB node may not reliably synchronize the downlink transmission timing of its IAB-DU (e.g., the downlink transmission timing being synchronized for all DUs in the IAB network, as described in connection with FIG. 7A) and the IAB node's synchronization with the other IAB nodes may experience drift.

In some aspects, the IAB node may use $T_{delta}$ to assist with OTA synchronization along with transmission timing alignment at the IAB node (e.g., as in FIG. 7B) and/or reception timing alignment at the IAB node (as in FIG. 7C). $T_{delta}$ is a function of, and captures, the offset (e.g., the delta or difference) between the uplink reception timing and the downlink transmission timing at the parent node. As an IAB node operates in a mode for transmission timing alignment at the IAB node (e.g., case 6 or the alignment described in FIG. 7B), the parent IAB node may track the reception timing from the IAB node and its offset to the downlink transmission timing of the parent IAB node. The offset may be equal to the one-way propagation delay from the IAB node to the parent IAB node (e.g., because the uplink transmission timing of the IAB node in case 6 is the same as the downlink transmission timing of that IAB node, as shown for 710 and 706 in FIG. 7B, which is also aligned with the downlink transmission timing of the parent IAB node based on the downlink transmission timing, as shown for 706 and 708 in FIGS. 7A and 7B). The parent IAB node may send an updated $T_{delta}$ value to the child IAB node, e.g., if the parent IAB node determines that the timing offset between DL transmission and UL reception (based on the UL reception of the signal from the child IAB node) changes by more than a threshold amount of time. The child IAB node receives the updated $T_{delta}$ value and can adjust its downlink transmission timing to address possible drift in synchronization between the parent and child IAB nodes.

In some aspects, and IAB node may change between timing alignment modes, e.g., between downlink transmission alignment across the DUs of the IAB network (e.g., case 1) and transmission timing alignment at a given IAB node (e.g., case 6) and/or reception timing alignment at an IAB node (e.g., case 7). As the IAB node may change between these at least these three different timing alignment modes, and possibly other timing alignment modes, the indication and/or interpretation of the $T_{delta}$ value from a parent IAB node may be different.

As an example, if the IAB-MT follows the downlink transmission timing alignment among DUs (e.g., Case 1 alignment) without transmission alignment or reception alignment at an IAB node, the IAB node's uplink signal will arrive at a first time reference with a first offset to the parent node's downlink transmission timing. The first offset is configured or decided by the parent IAB node, e.g., based on its choice of implementation. In contrast, if the IAB-MT operates based on transmission timing alignment at a given IAB node (e.g. Case 6) and selects its own uplink transmission timing to align with its downlink transmission timing, the IAB node's uplink signal will arrive at a second time reference with a second offset to the parent IAB node's downlink transmission timing. The second offset is a function of one-way propagation delay between the IAB node and the parent node, for example. If the IAB node operates based on reception timing alignment at the IAB node (e.g., Case 7) with the IAB-MT transmission timing of the node obtained from the parent IAB node through a TA that instructs the IAB-MT to adjust its uplink transmission timing, the IAB node's uplink signal will arrive at the parent node a third time with a third offset to the parent IAB node's downlink transmission timing. The third offset is a function of one-way propagation delay between the parent IAB node and its own parent.

Aspects presented herein enable an IAB node to apply or maintain OTA synchronization as the IAB node applies one of multiple different types of timing alignment, such as case 1, case 6, or case 7.

In some aspects, there may be no indication of $T_{delta}$ from a parent IAB node to a child IAB node for a mode involving transmission timing alignment at the child IAB node (e.g., case 6) and/or a mode involving reception timing alignment at the child IAB node (e.g., case 7). If the IAB node receives $T_{delta}$ from a parent IAB node, the child IAB node may determine that the $T_{delta}$ is associated with downlink transmission timing across DUs (e.g., case 1) and corresponds to the first offset in the examples described above. The IAB node may apply the $T_{delta}$ to synchronize its downlink transmission timing with the parent IAB node according to case 1 and not to alignment for case 6 or case 7.

Figure 9:
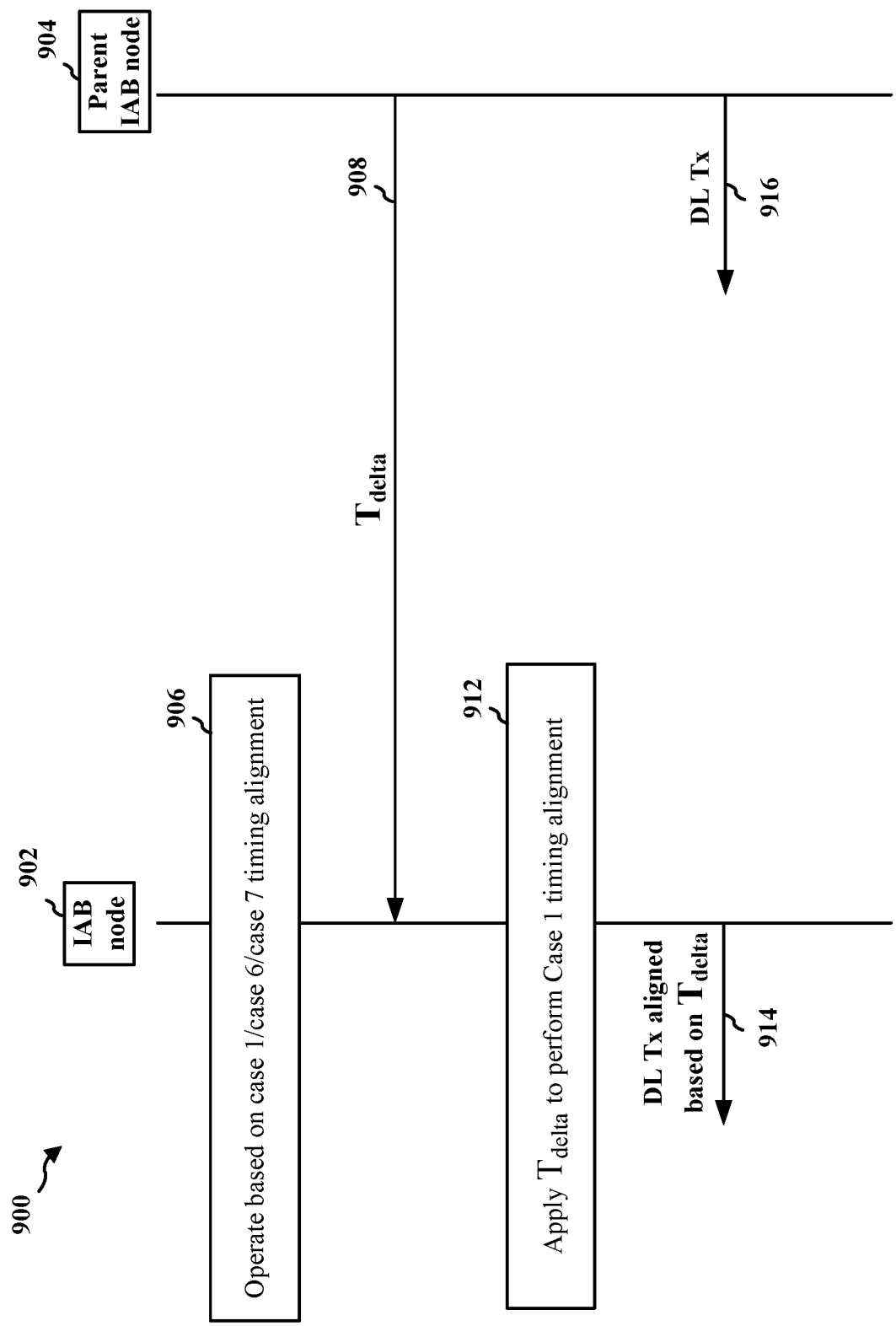
FIG. 9 is a communication flow diagram illustrating example aspects of timing alignment based on a time difference parameter indicated by a parent IAB node, in accordance with various aspects of the present disclosure.

FIG. 9 illustrates an example 900 communication flow between an IAB node 902 and a parent IAB node 904. At 906, the IAB node 902 operates based on one of multiple different timing alignment modes. For example, the IAB node 902 may operate based on any of a case 1 timing alignment of downlink transmissions among DUs (such as in FIG. 7A), case 6 timing alignment of transmissions an IAB node (e.g., such as in FIG. 7B), and/or case 7 timing alignment of reception at an IAB node (e.g., such as in FIG. 7C). At 908, the IAB node 902 receives a time difference parameter $T_{delta}$ from the parent IAB node 904. The IAB node 902 determines that the $T_{delta}$ is applicable to case 1 timing alignment of downlink transmissions among DUs. At 912, the IAB node 902 applies the $T_{delta}$ for case 1 timing alignment to adjust the downlink transmission timing of the DU of the IAB node to align with the DU of the parent IAB node 904. Then, the IAB node 902 transmits downlink transmission(s) 914 having the timing adjusted based on $T_{delta}$ to synchronize the alignment to the downlink transmission 916 of the parent IAB node. As a further aspect, the IAB node may avoid drift and perform OTA synchronization if the IAB node is configured to operate based on case 1 timing alignment on a frequent set of resources, which may provide the IAB node with feedback from the parent IAB node to set and/or discipline the timing of the IAB node. As one example, the IAB node may be configured to operate based on case 1 timing at least one every 100 ms. In other examples, the IAB node may be configured to operate based on case 1 timing with a shorter frequency or with a longer frequency than 100 ms, such as every 200 ms, 300 ms, 400 ms, 500 ms, 600 ms, or 640 ms. As an example, the frequency may be associated with a length of hundreds of ms.

In some aspects, the IAB-MT transmission timing of the IAB node may be obtained from a TA command from the parent IAB node plus an offset from the parent node. The IAB node operating in timing alignment according to case 7 may determine that $T_{delta}$(for application in case 7 timing alignment)=$T_{delta}$(associated with case 1 alignment+an indicated offset.

In some aspects, $T_{delta}$ may be indicated for use in various types of timing alignment at the IAB node. The parent IAB node may provide information to the child IAB node that indicates the association between the indicated $T_{delta}$ and the associated type of timing alignment. For example, the indication may indicate whether the $T_{delta}$ was measured while the parent node was operating in case 1 and the child node was not operating in case 6. The indication may indicate whether the $T_{delta}$ was measured while the parent node was operating in case 7 and the child node was not operating in case 6. The indication may indicate whether the $T_{delta}$ was measured while the child node was operating in case 6. The indication may assist the IAB node in determining the type of timing alignment to which the IAB node should apply the received $T_{delta}$.

Figure 10:
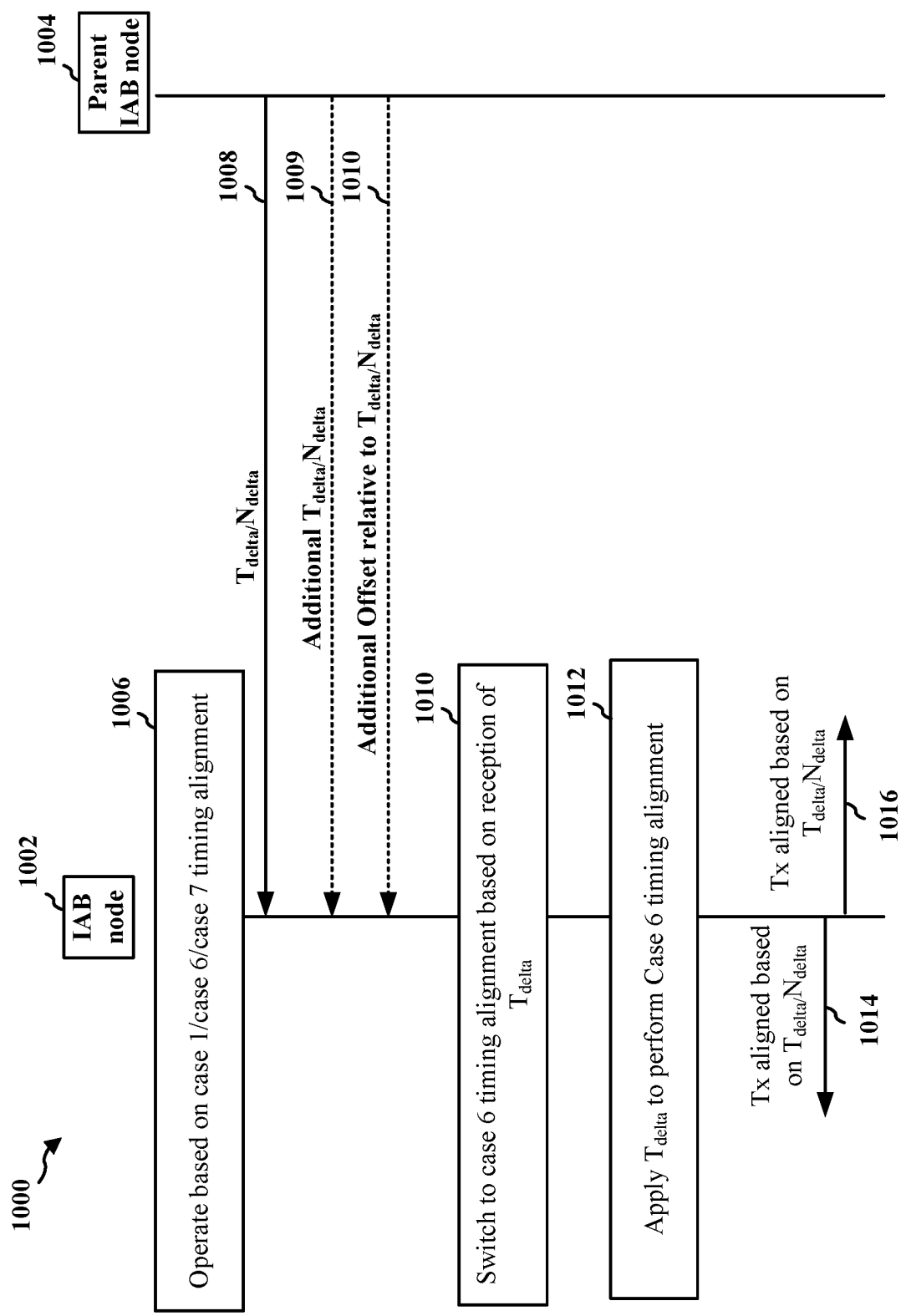
FIG. 10 is a communication flow diagram illustrating example aspects of timing alignment based on a time difference parameter indicated by a parent IAB node, in accordance with various aspects of the present disclosure.

In some aspects, the parent IAB node may provide a new $T_{delta}$ and/or $N_{delta}$ that is associated with transmission timing alignment between an MT and a DU at an IAB node (e.g., case 6). FIG. 10 illustrates an example communication flow 1000 that shows an example of a parent IAB node 1004 providing an additional $T_{delta}$ and/or $N_{delta}$ 1009 to an IAB node 1002 (e.g., that is a child node of parent IAB node 1004). In some aspects, the additional $T_{delta}$ and/or $N_{delta}$ 1009 may be configured and/or indicated in addition to a first $T_{delta}$ and/or $N_{delta}$ 1008 that is applicable for case 1. The additional $T_{delta}$ and/or $N_{delta}$ 1009 may be signaled to the IAB node 1002 in a MAC-CE and/or a DCI. The additional $T_{delta}$ and/or $N_{delta}$ for case 6 timing alignment may be indicated to the IAB node separately from the $T_{delta}$ and/or $N_{delta}$ 1008 for case 1 alignment, e.g., in separate messages. In other aspects, the additional $T_{delta}$ and/or $N_{delta}$ 1009 may be signaled to the IAB node 1002 together with the $T_{delta}$ and/or $N_{delta}$ 1008 for the case 1 timing alignment, e.g., in same message.

In some aspects, the parent IAB node 1004 may indicate an additional offset value 1010 relative to the $T_{delta}$ and/or $N_{delta}$ 1008 for case 1 alignment. The additional offset 1010 may be configured an indicated in addition to the $T_{delta}$ and/or $N_{delta}$ 1008 for case 1 alignment and may be offset parameter(s) that are associated with case 6 timing alignment. The additional offset 1010, relative to the $T_{delta}$ and/or $N_{delta}$ 1008, for case 6 timing alignment may be indicated to the IAB node 1002 separately from the $T_{delta}$ and/or $N_{delta}$ 1008 for case 1 alignment, e.g., in separate messages. In other aspects, the additional offset 1010 may be signaled to the IAB node 1002 together with the $T_{delta}$ and/or $N_{delta}$ 1008 for the case 1 timing alignment, e.g., in same message. The offset 1010 for case 6 timing alignment may be signaled to the IAB node 1002 in a MAC-CE and/or a DCI.

At 1012, the IAB node 1002 applies the additional $T_{delta}$ and/or $N_{delta}$ 1009 or the offset 1010 for case 6 timing alignment to adjust the transmission timing of the MT/DU of the IAB node. Then, the IAB node 1002 transmits downlink transmission(s) 1014 having the timing adjusted based on the $T_{delta}$ and/or $N_{delta}$ 1009 or the offset 1010. In some aspects, the IAB node 1002 may interpret the reception of $T_{delta}$ and/or $N_{delta}$ 1009 or the offset 1010 to indicate to switch from a different timing alignment mode to case 6 timing alignment, at 1010. For example, at 1006, the IAB node 1002 may operate in/perform a case 1 or case 7 timing alignment, and the IAB node 1002 may switch to perform a case 6 timing alignment in response to the reception of $T_{delta}$ and/or $N_{delta}$ 1009 or the offset 1010. Although this example is described for case 6, in some aspects, the additional $T_{delta}$ and/or $N_{delta}$ 1009 or the offset 1010 may be associated with case 7 timing alignment. Thus, at 1014 and 1016, the IAB node 1002 may adjust transmission or reception timing according to case 6 or case 7 timing alignment.

Figure 11:
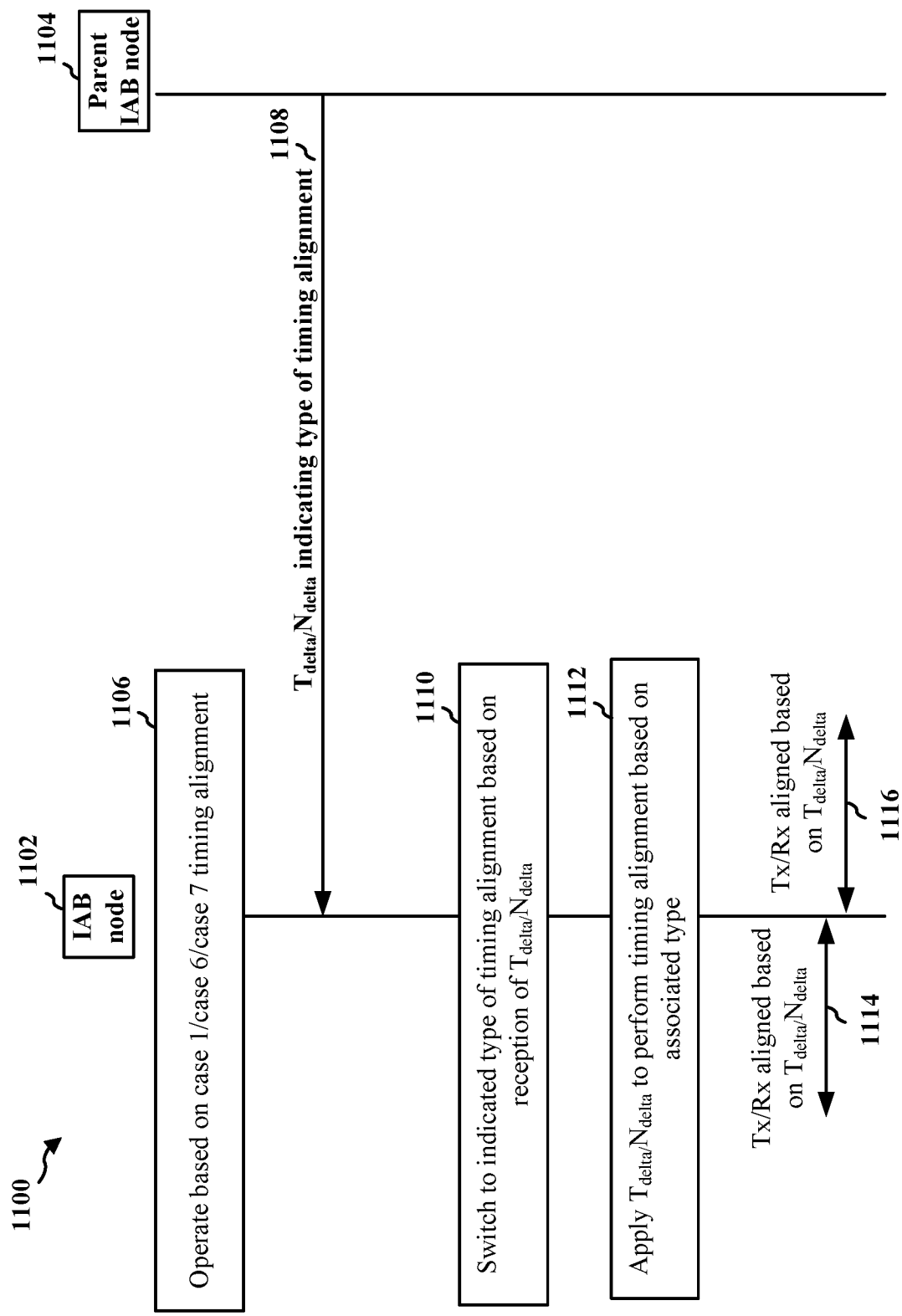
FIG. 11 is a communication flow diagram illustrating example aspects of timing alignment based on a time difference parameter indicated by a parent IAB node, in accordance with various aspects of the present disclosure.

In some aspects, the same $T_{delta}$ and/or $N_{delta}$ parameters may be used among different types of timing alignment. When a parent IAB node indicates the $T_{delta}$ and/or $N_{delta}$, the parent node may also indicate the type of timing alignment to which the parameter applies. FIG. 11 illustrates an example communication flow 1100 that shows an example of a parent IAB node 1104 providing an $T_{delta}$ and/or $N_{delta}$ 1108 to an IAB node 1102 (e.g., that is a child node of parent IAB node 1104). The transmission indicating the $T_{delta}$ and/or $N_{delta}$ 1108 may further indicate the type of timing alignment associated with the indicated parameter, e.g., the type of timing alignment on which the parameter is based and/or for which the parameter is intended to be applied. The $T_{delta}$ and/or $N_{delta}$ 1108 may be signaled to the IAB node 1102 in a MAC-CE and/or a DCI. In some aspects, a flag (e.g., a one or more bit flag in the message carrying the $T_{delta}$ and/or $N_{delta}$ 1108) may indicate one of different types of timing alignment (e.g., case 1, case 6, and/or case 7). The inclusion of the flag itself and/or a particular value of the flag may indicate, for example, that the $T_{delta}$ and/or $N_{delta}$ 1108 are associated with case 6 transmission timing alignment at a given IAB node. Similarly, the inclusion of the flag itself and/or a particular value of the flag may indicate, for example, that the $T_{delta}$ and/or $N_{delta}$ 1108 are associated with case 7 reception timing alignment at the IAB node. If the flag indicates between case 1 and case 6, the flag may include a single bit. As an example, "1" may indicate case 6 and "0" may indicate case 1, or the opposite with "0" indicating case 6 and "1" indicating case 1. If the flag indicates between case 1, case 6, and case 7, or other timing alignment cases, the flag may include two or more bits.

In some aspects, the resource on which the indication is sent may indicate the associated type of timing alignment. The IAB node 1102 may infer, or otherwise determine, the type of timing alignment associated with the $T_{delta}$ and/or $N_{delta}$ 1108 based on resources of the message carrying the parameter(s). As an example, if the IAB node 1102 receives the $T_{delta}$ and/or $N_{delta}$ 1108 on a time resource within a time offset before or after the resources in which Case 1 or Case 6 is adopted, the time resource of the $T_{delta}$ and/or $N_{delta}$ 1108 may indicate an association with case 1 timing alignment or case 6 timing alignment, respectively. As another example, Case 1 and Case 6 timing alignment may be associated with separate spatial resources. The IAB-MT may use beam 1 when operating with Case 1 (which may be associated with a multiplexing scenario such as TDM-only), and beam 2 when operating with Case 6 (which may be associated with a multiplexing scenario such as SDM-TX or (MT-TX&DU-TX))—in this case, if the IAB node 1102 (e.g., MT) receives the $T_{delta}$ and/or $N_{delta}$ 1108 on a given beam, the IAB node may associate it with the corresponding timing Case.

At 1112, the IAB node 1102 applies the received $T_{delta}$ and/or $N_{delta}$ 1008 for the indicated type of timing alignment to adjust the transmission/reception timing of the MT/DU of the IAB node 1102, as illustrated at 1114 and 1116. In some aspects, the IAB node 1102 may interpret the reception of $T_{delta}$ and/or $N_{delta}$ 1108 with an indication of a particular type of timing alignment as an indication to switch to perform the indicated type of timing alignment, at 1110. For example, at 1106, the IAB node 1102 may operate in/perform a first type of timing alignment and may switch at 1110 to a different type of timing alignment associated with the $T_{delta}$ and/or $N_{delta}$ 1108.

Figure 12:
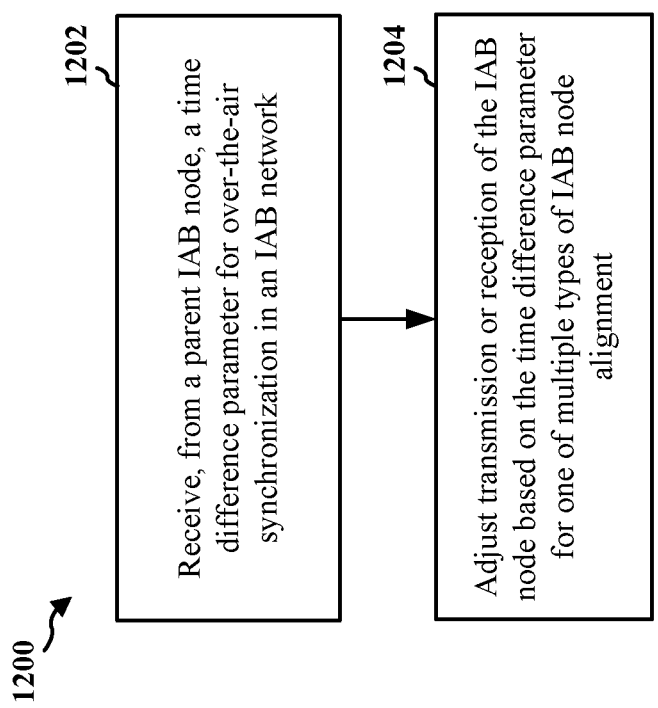
FIG. 12 is a flowchart of a method of wireless communication including timing adjustment based on a time difference parameter from a parent IAB node, in accordance with various aspects of the present disclosure.

FIG. 12 is a flowchart 1200 of a method of wireless communication. The method may be performed by an IAB node (e.g., the IAB node 103, 310, 410, 420, 510, 520a, 520b, 704, 902, 1002, 1102; the apparatus 1402; the baseband unit 1404, which may include the memory 376 and which may be the entire IAB node 310 or a component of the IAB node 310, such as the TX processor 316, the RX processor 370, and/or the controller/processor 375). The method may enable an IAB node to apply a time difference parameter for over-air-synchronization, e.g., $T_{delta}$ and/or $N_{delta}$, among multiple alignment types.

FIG. 1202, the IAB node receives, from a parent IAB node, a time difference parameter for over-the-air synchronization in an IAB network. FIGS. 9, 10, and 11 illustrate examples of an IAB node receiving a time difference parameter from an parent IAB node. For example, the time difference parameter may comprise a $T_{delta}$ and/or $N_{delta}$, e.g., as described in connection with FIG. 9 or 11. For example, the $T_{delta}$ may be based on a time difference between an uplink reception time and a downlink transmission time at the parent IAB node, as described in connection with FIG. 8. The time difference parameter may correspond to an additional $T_{delta}$ and/or $N_{delta}$ 1009 or a time offset 1010 to $T_{delta}$ and/or $N_{delta}$, e.g., as described in connection with FIG. 10. In some aspects, the reception of the time difference parameter may be performed by the time difference parameter reception component 1440 via the reception component 1430 and/or the RF transceiver 1422 of the apparatus 1402 in FIG. 14.

At 1204, the IAB node adjusts transmission or reception of the IAB node based on the time difference parameter for one of multiple types of IAB node alignment, e.g., to provide alignment among IAB nodes (as in case 1), at the IAB node (as in case 6) and/or at the parent IAB node (as in case 7). The multiple types of timing alignment may include a first type of alignment (e.g., case 1) comprising downlink transmission timing alignment across each IAB node of the IAB network, a second type of alignment (e.g., case 6) between uplink transmission at an IAB-MT of the IAB node and downlink transmission at an IAB-DU of the IAB node, and a third type of alignment (e.g., case 7) between downlink reception at the IAB-MT of the IAB node and uplink reception at the IAB-DU of the IAB node. The adjustment of the transmission or reception may be performed by the timing alignment component 1442 of the apparatus 1402 in FIG. 14. For example, the IAB node may adjust the downlink transmission timing based on the time difference parameter $T_{delta}$ to align with the downlink transmission timing of other IAB nodes according to case 1 alignment. In other examples, the IAB node may adjust the uplink transmission timing and/or the DL transmission timing of the IAB node to provide alignment between UL and DL transmission at the IAB node according to case 6 alignment. In other examples, the IAB node may adjust the uplink reception timing or the downlink reception timing to provide alignment between the UL and DL reception according to case 7 alignment.

In some aspects, the time difference parameter may correspond to a $T_{delta}$, and the IAB node may adjust a downlink transmission time of the IAB node based on $T_{delta}$ according to the first type of alignment. For example, the reception of the $T_{delta}$, at 1202, may indicate to the IAB node to apply the first type of alignment. FIG. 9 illustrates an example in which the $T_{delta}$ is associated with a case 1 timing alignment.

In some aspects, the time difference parameter may correspond to an offset parameter indicated with a timing advance command for the third type of alignment, and the IAB node may calculate a $T_{delta}$ from the offset parameter, e.g., and a TA command, and may adjust the transmission or the reception of the IAB node with the calculated $T_{delta}$ based on the third type of alignment (e.g., case 7).

In some aspects, the indication of the time difference parameter that is received from the parent IAB node may indicate an association to one of the multiple types of alignment. For example, a first time difference parameter ($T_{delta}$ and/or $N_{delta}$) may be associated with the first type of alignment and a second time difference parameter (additional $T_{delta}$ and/or $N_{delta}$ 1009 or a time offset 1010 to $T_{delta}$ and/or $N_{delta}$) may be associated with the second type of alignment. The IAB node may receive both the first time difference parameter and the second time difference parameter from the parent IAB node, e.g., as described in connection with the example in FIG. 10. The IAB node may receive the first time difference parameter and the second time difference parameter in separate messages from the parent IAB node. The IAB node may receive the first time difference parameter and the second time difference parameter in a same message from the parent IAB node. The first time difference parameter (e.g., $T_{delta}$ and/or $N_{delta}$ 1008) may be associated with the first type of alignment and the second time difference parameter may be a time offset (offset 1010 to $T_{delta}$ and/or $N_{delta}$) associated with the second type of alignment, the time offset being relative to the first time difference parameter. The IAB node may receive both the first time difference parameter and the second time difference parameter from the parent IAB node. The IAB node may receive the first time difference parameter and the second time difference parameter in separate messages from the parent IAB node. The IAB node may receive the first time difference parameter and the second time difference parameter in a same message from the parent IAB node.

In some aspects, the indication of the time difference parameter may comprise a flag corresponding to a type of alignment associated with the time difference parameter, e.g., as described in connection with the example in FIG. 11. In some aspects, a resource in which the indication of the time difference parameter is received may indicate a type of alignment associated with the time difference parameter, e.g., as described in connection with the example in FIG. 11.

Figure 13:
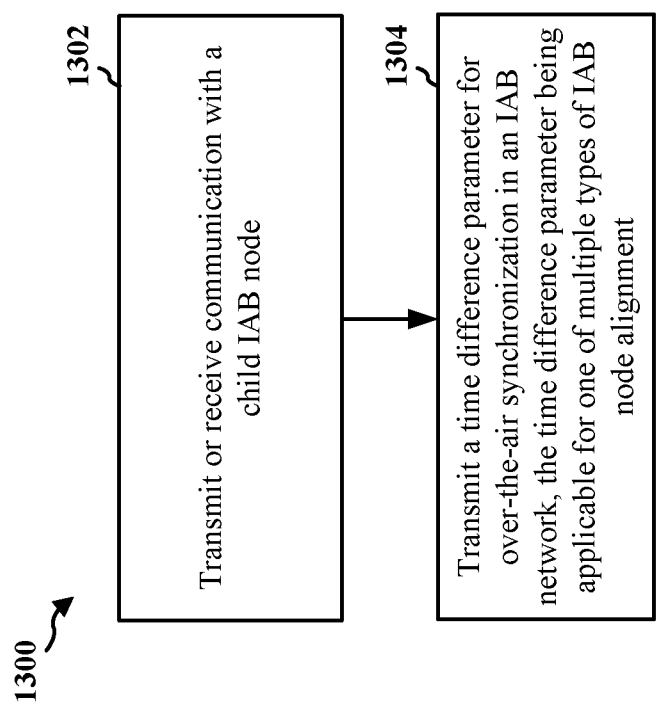
FIG. 13 is a flowchart of a method of wireless communication including indicating a time difference parameter to a child IAB node, in accordance with various aspects of the present disclosure.

FIG. 13 is a flowchart 1300 of a method of wireless communication. The method may be performed by a parent IAB node (e.g., the IAB node 103, 310, 410, 420, 510, 520a, 520b, 702, 904, 1004, 1104; the apparatus 1402; the baseband unit 1404, which may include the memory 376 and which may be the entire IAB node 310 or a component of the IAB node 310, such as the TX processor 316, the RX processor 370, and/or the controller/processor 375. The method may enable an IAB node to apply a time difference parameter for over-air-synchronization, e.g., $T_{delta}$ and/or $N_{delta}$, among multiple alignment types.

At 1302, the parent IAB node transmits or receives communication with a child IAB node. The communication may be based on any of the aspects described in connection with FIG. 4, 5, 6, 7, 9, 10, or 11. The communication may be based on one of multiple types of timing alignment. In some aspects, the transmission and reception may be performed, e.g., by the reception component 1430 and the transmission component 1434 of the apparatus 1402 in FIG. 10.

At 1304, the parent IAB node transmits a time difference parameter for over-the-air synchronization in an IAB network, the time difference parameter being applicable for one of multiple types of IAB node alignment, e.g., to provide alignment among IAB nodes (as in case 1), at the IAB node (as in case 6) and/or at the parent IAB node (as in case 7). FIGS. 9, 10, and 11 illustrate examples of a parent IAB node transmitting a time difference parameter from an parent IAB node. For example, the time difference parameter may comprise a $T_{delta}$ and/or $N_{delta}$, e.g., as described in connection with FIG. 9 or 11. For example, the $T_{delta}$ may be based on a time difference between an uplink reception time and a downlink transmission time at the parent IAB node, as described in connection with FIG. 8. The time difference parameter may correspond to an additional $T_{delta}$ and/or $N_{delta}$ 1009 or an offset 1010 to $T_{delta}$ and/or $N_{delta}$, e.g., as described in connection with FIG. 10. In some aspects, the transmission of the time difference parameter may be performed by the time difference parameter indicator component 1444 via the transmission component 1434 and/or the RF transceiver 1422 of the apparatus 1402 in FIG. 14.

The multiple types of timing alignment may include a first type of alignment (e.g., case 1) comprising downlink transmission timing alignment across each IAB node of the IAB network, a second type of alignment (e.g., case 6) between uplink transmission at an IAB-MT of the IAB node and downlink transmission at an IAB-DU of the IAB node, and a third type of alignment (e.g., case 7) between downlink reception at the IAB-MT of the IAB node and uplink reception at the IAB-DU of the IAB node.

In some aspects, the time difference parameter may correspond to a $T_{delta}$ and may be associated with the first type of alignment. For example, the transmission of the $T_{delta}$ at 1304, may indicate to the child IAB node to apply the first type of alignment. FIG. 9 illustrates an example in which the $T_{delta}$ is associated with a case 1 timing alignment.

In some aspects, the time difference parameter may correspond to an offset parameter indicated with a timing advance command for the third type of alignment and for calculation of a $T_{delta}$ from the offset parameter, e.g., and a TA command, and may be associated with adjustment of the transmission or the reception of the IAB node with the calculated $T_{delta}$ based on the third type of alignment (e.g., case 7).

In some aspects, the indication of the time difference parameter that is transmitted from the parent IAB node may indicate an association to one of the multiple types of alignment. For example, a first time difference parameter ($T_{delta}$ and/or $N_{delta}$) may be associated with the first type of alignment and a second time difference parameter (additional $T_{delta}$ and/or $N_{delta}$ 1009 or an offset 1010 to $T_{delta}$ and/or $N_{delta}$) may be associated with the second type of alignment. The parent IAB node may transmit both the first time difference parameter and the second time difference parameter to the child IAB node, e.g., as described in connection with the example in FIG. 10. The parent IAB node may transmit the first time difference parameter and the second time difference parameter in separate messages to the child IAB node. The parent IAB node may transmit the first time difference parameter and the second time difference parameter in a same message to the child IAB node. The first time difference parameter (e.g., $T_{delta}$ and/or $N_{delta}$ 1008) may be associated with the first type of alignment and the second time difference parameter may be a time offset (offset 1010 to $T_{delta}$ and/or $N_{delta}$) associated with the second type of alignment, the time offset being relative to the first time difference parameter. The parent IAB node may transmit both the first time difference parameter and the second time difference parameter to the child IAB node. The parent IAB node may transmit the first time difference parameter and the second time difference parameter in separate messages to the child IAB node. The parent IAB node may transmit the first time difference parameter and the second time difference parameter in a same message to the child IAB node.

In some aspects, the indication of the time difference parameter may comprise a flag corresponding to a type of alignment associated with the time difference parameter, e.g., as described in connection with the example in FIG. 11. In some aspects, a resource in which the indication of the time difference parameter is transmitted may indicate a type of alignment associated with the time difference parameter, e.g., as described in connection with the example in FIG. 11.

Figure 14:
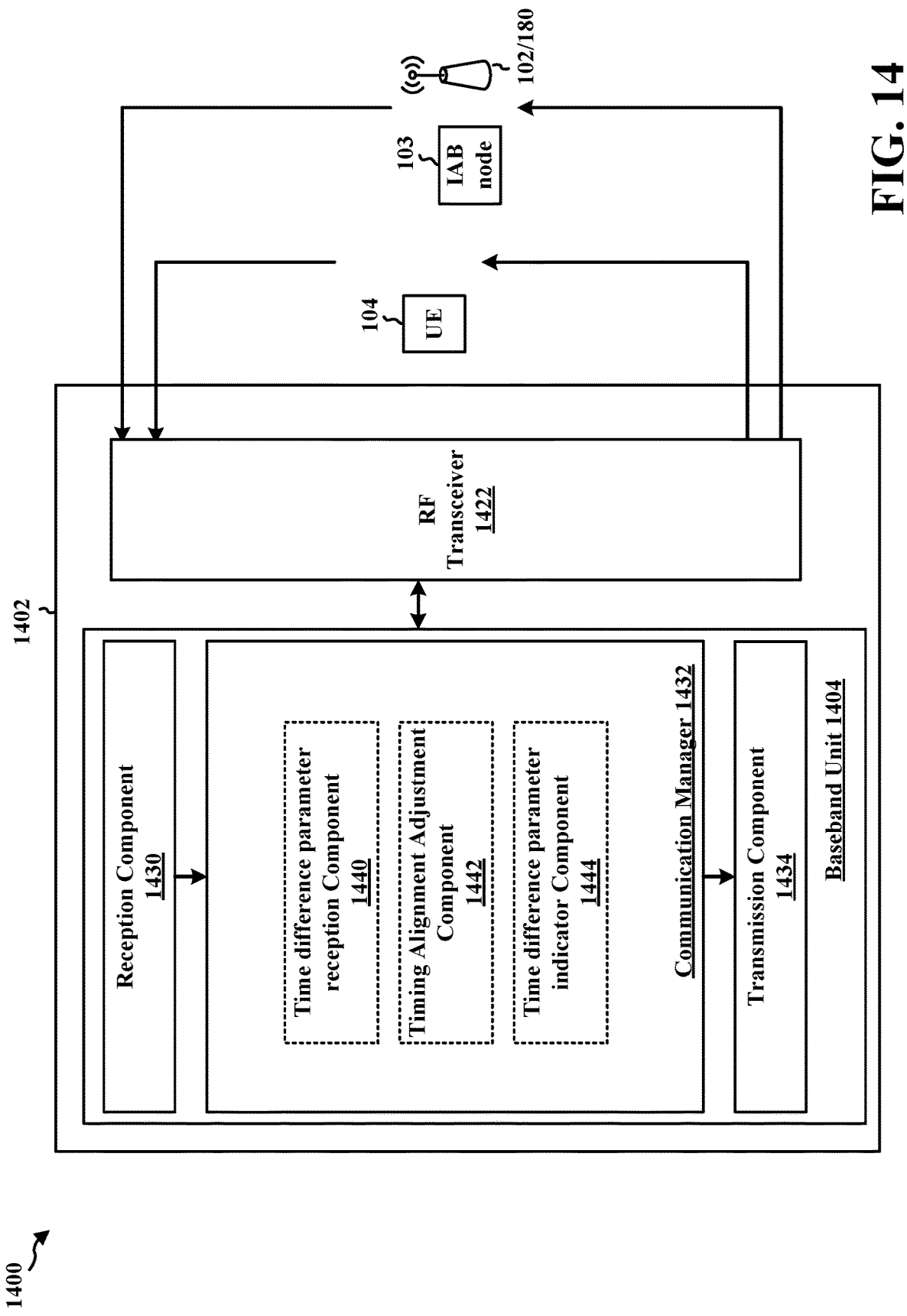
FIG. 14 is a diagram illustrating an example of a hardware implementation for an apparatus employing a processing system that may be configured to transmit and/or receive a time difference parameter for association with one of multiple types of timing alignment.

FIG. 14 is a diagram 1400 illustrating an example of a hardware implementation for an apparatus 1402. The apparatus 1402 may be an IAB node, a component of an IAB node, or may implement IAB node functionality. The apparatus 1402 may correspond to the IAB node 103, 310, 420, 520a-b, 606a, 606b, 702, 704, 802, 804, 902, 904, 1002, 1004, 1102, or 1104. In some aspects, the apparatus may include a baseband unit 1404. The baseband unit 1404 may communicate through a cellular RF transceiver with one or more UEs 104. The baseband unit 1404 may also communicate through a cellular RF transceiver with one or more IAB nodes 103. The IAB node 103 may be a parent node of the apparatus or may be a child node of the apparatus. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the IAB node 310 and may include the memory 376 and/or at least one of the TX processor 316, the RX processor 370, and the controller/processor 375.

The communication manager 1432 includes time difference parameter reception component 1440 that is configured to receive, from a parent IAB node, a time difference parameter for over-the-air synchronization in an IAB network, e.g., as described in connection with 1202 in FIG. 12. The communication manager 1432 includes time difference parameter indicator component 1444 that is configured to indicate, to a child IAB node, a time difference parameter for over-the-air synchronization in an IAB network, e.g., as described in connection with 1304 in FIG. 13. The communication manager 1432 further includes a timing alignment component 1442 that is configured to adjust transmission or reception of the IAB node based on the time difference parameter for one of multiple types of alignment at the IAB node and/or the parent IAB node, e.g., as described in connection with 1204 in FIG. 12. The apparatus 1402 further includes a reception component 1430 and transmission component 1434 configured to transmit and receive communication with a child IAB node, e.g., as described in connection with 1302 in FIG. 13.

The apparatus may include additional components that perform each of the blocks of the algorithm in the flowcharts of FIG. 12 or 13, and/or the aspects performed by the IAB node in any of FIG. 9, 10, or 11. As such, each block in the flowcharts of FIGS. 12 or 13, and/or the aspects performed by the IAB node in any of FIG. 9, 10, or 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, may include means for receiving, from a parent IAB node, a time difference parameter for OTA synchronization in an IAB network and means for adjusting transmission or reception of the IAB node based on the time difference parameter for one of multiple types of alignment at the IAB node and/or the parent IAB node. The apparatus 1402 may further include means for transmitting or receiving communication with a child IAB node and means for transmitting a time difference parameter for over-the-air synchronization in an IAB network, the time difference parameter being applicable for one of multiple types of alignment at the child IAB node. The apparatus 1402 may include means for performing the aspects of FIG. 12 and FIG. 13 in some aspects, because the apparatus 1402 may operate as a parent node to one or more child nodes and may operate as a child node to a parent node. The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teaching described herein, without limitation.

Aspect 1 is a method of wireless communication at an IAB node, comprising: receiving, from a parent IAB node, a time difference parameter for over-the-air synchronization in an IAB network; and adjusting transmission or reception of the IAB node based on the time difference parameter for one of multiple types of IAB node alignment.

In aspect 2, the method of aspect 1 further includes that the multiple types of IAB node alignment include a first type of alignment comprising downlink transmission timing alignment across each IAB node of the IAB network, a second type of alignment between uplink transmission at an IAB-MT of the IAB node and downlink transmission at an IAB-DU of the IAB node, and a third type of alignment between downlink reception at the IAB-MT of the IAB node and uplink reception at the IAB-DU of the IAB node.

In aspect 3, the method of aspect 1 or aspect 2 further includes that the time difference parameter is associated with the first type of alignment and the third type of alignment.

In aspect 4, the method of aspect 1 or aspect 2 further includes that the time difference parameter corresponds to a $T_{delta}$ based on a time difference between an uplink reception time and a downlink transmission time at the parent IAB node, and the IAB node adjusts a downlink transmission time of the IAB node based on $T_{delta}$ according to the first type of alignment.

In aspect 5, the method of aspect 4 further includes that reception of the $T_{delta}$ indicates to the IAB node to apply the first type of alignment.

In aspect 6, the method of aspect 1 or aspect 2 further includes that the time difference parameter corresponds to an offset parameter indicated with a timing advance command for the third type of alignment, the method further comprising: calculating a $T_{delta}$ from the offset parameter and adjusting the transmission or the reception of the IAB node with the $T_{delta}$ based on the third type of alignment.

In aspect 7, the method of any of aspects 1-3 further includes that an indication of the time difference parameter that is received from the parent IAB node indicates an association to one of the multiple types of IAB node alignment.

In aspect 8, the method of aspect 1 or aspect 7 further include that a first time difference parameter is associated with the first type of alignment and a second time difference parameter is associated with the second type of alignment.

In aspect 9, the method of aspect 8 further includes that the IAB node receives both the first time difference parameter and the second time difference parameter from the parent IAB node.

In aspect 10, the method of aspect 9 further includes that the IAB node receives the first time difference parameter and the second time difference parameter in separate messages from the parent IAB node.

In aspect 11, the method of aspect 9 further includes that the IAB node receives the first time difference parameter and the second time difference parameter in a same message from the parent IAB node.

In aspect 12, the method of aspect 8 further includes that the first time difference parameter is associated with the first type of alignment and the second time difference parameter is a time offset associated with the second type of alignment, the time offset being relative to the first time difference parameter.

In aspect 13, the method of aspect 8 further includes that the IAB node receives both the first time difference parameter and the second time difference parameter from the parent IAB node.

In aspect 14, the method of aspect 13 further includes that the IAB node receives the first time difference parameter and the second time difference parameter in separate messages from the parent IAB node.

In aspect 15, the method of aspect 13 further includes that the IAB node receives the first time difference parameter and the second time difference parameter in a same message from the parent IAB node.

In aspect 16, the method of any of aspects 7-15 further includes that the indication of the time difference parameter comprises a flag corresponding to a type of alignment associated with the time difference parameter.

In aspect 17, the method of any of aspects 7-16 further includes that a resource in which the indication of the time difference parameter is received indicates a type of alignment associated with the time difference parameter.

Aspect 18 is an apparatus for wireless communication, comprising: means for performing the method of any of aspects 1-17.

In aspect 19, the apparatus of aspect 18 further includes at least one antenna and a transceiver coupled to the at least one antenna.

Aspect 20 is an apparatus for wireless communication, comprising: a memory; and at least one processor coupled to the memory and, based at least in part on information stored in the memory, the at least one processor is configured to perform the method of any of aspects 1-17.

In aspect 21, the apparatus of aspect 20 further includes at least one of an antenna or a transceiver coupled to the at least one antenna and the at least one processor.

Aspect 22 is a non-transitory computer-readable medium storing computer executable code, the code when executed by a processor cause the processor to perform the method of any of aspects 1-17.

Aspect 23 is a method of wireless communication at an IAB parent node, comprising: transmitting or receiving communication with an IAB node that is a child node of the parent IAB node; and transmitting a time difference parameter for over-the-air synchronization in an IAB network, the time difference parameter being applicable for one of multiple types of IAB node alignment.

In aspect 24, the method of aspect 23 further includes that the multiple types of IAB node alignment include: a first type of alignment comprising downlink transmission timing alignment across each IAB node of the IAB network, a second type of alignment between uplink transmission at an IAB-MT of the IAB node and downlink transmission at an IAB-DU of the IAB node, and a third type of alignment between downlink reception at the IAB-MT of the IAB node and uplink reception at the IAB-DU of the IAB node.

In aspect 25, the method of aspect 23 or aspect 24 further includes that the time difference parameter corresponds to a $T_{delta}$ associated with the first type of alignment, the $T_{delta}$ being based on a time difference between an uplink reception time and a downlink transmission time at the parent IAB node.

In aspect 26, the method of aspect 25 further includes that transmission of the $T_{delta}$ indicates to the IAB node to apply the first type of alignment.

In aspect 27, the method of aspect 23 or aspect 24 further includes that an indication of the time difference parameter from the parent IAB node indicates an association to one of the multiple types of IAB node alignment.

In aspect 28, the method of aspect 23, 24, or 27 further includes that a first time difference parameter is associated with the first type of alignment and a second time difference parameter is associated with the second type of alignment.

In aspect 29, the method of aspect 23, 24, 27, or 28 further includes that the parent IAB node transmits both the first time difference parameter and the second time difference parameter to the IAB node.

In aspect 30, the method of aspect 29 further includes that the parent IAB node transmits the first time difference parameter and the second time difference parameter in separate messages to the IAB node.

In aspect 31, the method of aspect 29 further includes that the parent IAB node transmits the first time difference parameter and the second time difference parameter in a same message to the IAB node.

In aspect 32, the method of aspect 23, 24, or 27 further includes that the first time difference parameter is associated with the first type of alignment and the second time difference parameter is a time offset associated with the second type of alignment, the time offset being relative to the first time difference parameter.

In aspect 33, the method of aspect 32 further includes that the parent IAB node transmits both the first time difference parameter and the second time difference parameter to the IAB node.

In aspect 34, the method of aspect 33 further includes that the parent IAB node transmits the first time difference parameter and the second time difference parameter in separate messages to the IAB node.

In aspect 35, the method of aspect 33 further includes that the parent IAB node transmits the first time difference parameter and the second time difference parameter in a same message to the IAB node.

In aspect 36, the method of any of aspects 27-35 includes that the indication of the time difference parameter further comprises a flag corresponding to a type of alignment associated with the time difference parameter.

In aspect 37, the method of any of aspects 27-36 includes that a resource in which the indication of the time difference parameter is transmitted further indicates a type of alignment associated with the time difference parameter.

Aspect 38 is an apparatus for wireless communication, comprising: means for performing the method of any of aspects 23-37.

In aspect 39, the apparatus of aspect 38 further includes at least one of an antenna or a transceiver coupled to the at least one antenna.

Aspect 40 is an apparatus for wireless communication, comprising: a memory; and at least one processor coupled to the memory and, based at least in part on information stored in the memory, the at least one processor is configured to perform the method of any of aspects 23-37.

In aspect 41, the apparatus of aspect 40 further includes at least one of an antenna or a transceiver coupled to the at least one antenna and the at least one processor.

Aspect 42 is a non-transitory computer-readable medium storing computer executable code, the code when executed by a processor cause the processor to perform the method of any of aspects 23-37.

What is claimed is:

1. An apparatus for wireless communication at an integrated access and backhaul (IAB) node, comprising: a memory; and at least one processor coupled to the memory and, based at least in part on information stored in the memory, the at least one processor is configured to: receive, from a parent IAB node, a time difference parameter for over-the-air synchronization in an IAB network; and adjust transmission or reception timing at the IAB node based on the time difference parameter for one of multiple types of IAB node alignment, wherein the multiple types of the IAB node alignment include: a first type of alignment comprising downlink transmission timing alignment across each IAB node of the IAB network, a second type of alignment between uplink transmission at an IAB mobile termination (IAB-MT) of the IAB node and downlink transmission at an IAB distributed unit (IAB-DU) of the IAB node, and a third type of alignment between downlink reception at the IAB-MT of the IAB node and uplink reception at the IAB-DU of the IAB node.

2. The apparatus of claim 1, further comprising: at least one transceiver coupled to the at least one processor and configured to receive the time difference parameter, wherein the multiple types of the IAB node alignment include:

a first type of alignment comprising downlink transmission timing alignment across each IAB node of the IAB network, a second type of alignment between uplink transmission at an IAB mobile termination (IAB-MT) of the IAB node and downlink transmission at an IAB distributed unit (IAB-DU} of the IAB node, and a third type of alignment between downlink reception at the I[AB-MT of the IAB node and uplink reception at the IAB-DU of the IAB node.

3. The apparatus of claim 2, wherein the time difference parameter is associated with the first type of alignment and the third type of alignment.

4. The apparatus of claim 2, wherein the time difference parameter corresponds to a timing delta (Tdetta) based on a time difference between an uplink reception time and a downlink transmission time at the parent IAB node, and the IAB node adjusts a downlink transmission time of the IAB node based on the Tdelta according to the first type of alignment from the multiple types of the IAB node alignment.

5. The apparatus of claim 4, wherein reception of the Taeita indicates to the IAB node to apply the first type of alignment.

6. The apparatus of claim 2, wherein the time difference parameter corresponds to an offset parameter indicated with a timing advance command for the third type of alignment, wherein the at least one processor is further configured to:
calculate a Tdetta from the offset parameter and adjusting the transmission or the reception of the IAB node with the Tdelta based on the third type of alignment.

7. The apparatus of claim 2, wherein a first time difference parameter is associated with the first type of alignment and a second time difference parameter is associated with the second type of alignment.

8. The apparatus of claim 7, wherein the at least one processor is configured to receive both the first time difference parameter and the second time difference parameter from the parent IAB node.

9. The apparatus of claim 8, wherein the at least one processor is configured to receive the first time difference parameter and the second time difference parameter in separate messages from the parent IAB node or in a same message from the parent IAB node.

10. The apparatus of claim 7, wherein the first time difference parameter is associated with the first type of alignment and the second time difference parameter is a time offset associated with the second type of alignment, the time offset being relative to the first time difference parameter.

11. The apparatus of claim 10, wherein the at least one processor is configured to receive both the first time difference parameter and the second time difference parameter from the parent IAB node.

12. The apparatus of claim 11, wherein the at least one processor is configured to receive the first time difference parameter and the second time difference parameter in separate messages from the parent IAB node.

13. The apparatus of claim 11, wherein the at least one processor is configured to receive the first time difference parameter and the second time difference parameter in a same message from the parent IAB node.

14. The apparatus of claim 2, wherein an indication of the time difference parameter that is received from the parent IAB node indicates an association to one of the multiple types of the IAB node alignment.

15. The apparatus of claim 14, wherein the indication of the time difference parameter comprises a flag corresponding to a type of alignment associated with the time difference parameter.

16. The apparatus of claim 14, wherein a resource in which the indication of the time difference parameter is received indicates a type of alignment associated with the time difference parameter.

17. An apparatus for wireless communication at a parent integrated access and backhaul (IAB) node, comprising: a memory; and at least one processor coupled to the memory and, based at least in part on information stored in the memory, the at least one processor is configured to:
transmit or receive communication with an IAB node that is a child node of the parent IAB node; and
transmit a time difference parameter for over-the-air synchronization in an IAB network, the time difference parameter being applicable for one of multiple types of IAB node alignment, wherein the multiple types of the IAB node alignment include: a first type of alignment comprising downlink transmission timing alignment across each IAB node of the IAB network,
a second type of alignment between uplink transmission at an IAB mobile termination (IAB-MT) of the IAB node and downlink transmission at an IAB distributed unit (IAB-DU) of the IAB node, and a third type of alignment between downlink reception at the IAB-MT of the IAB node and uplink reception at the IAB-DU of the IAB node.

18. The apparatus of claim 17, further comprising: at least one transceiver coupled to the at least one processor, wherein the multiple types of the IAB node alignment include:
a first type of alignment comprising downlink transmission timing alignment across each IAB node of the IAB network,
a second type of alignment between uplink transmission at an IAB mobile termination (IAB-MT) of the IAB node and downlink transmission at an IAB distributed unit (IAB-DU} of the IAB node, and
a third type of alignment between downlink reception at the IAB-MT of the IAB node and uplink reception at the IAB-DU of the IAB node.

19. The apparatus of claim 18, wherein the time difference parameter corresponds to a timing delta (Tdelta) associated with the first type of alignment, the Tdelta being based a time difference between an uplink reception time and a downlink transmission time at the parent IAB node.

20. The apparatus of claim 19, wherein transmission of the Taeta indicates to the IAB node to apply the first type of alignment.

21. The apparatus of claim 18, wherein an indication of the time difference parameter from the parent IAB node indicates an association to one of the multiple types of IAB node alignment.

22. The apparatus of claim 21, wherein a first time difference parameter is associated with the first type of alignment and a second time difference parameter is associated with the second type of alignment.

23. The apparatus of claim 22, wherein the at least one processor is configured to transmit both the first time difference parameter and the second time difference parameter to the IAB node, and wherein the at least one processor is configured to:
transmit the first time difference parameter and the second time difference parameter in separate messages to the IAB node, or
transmit the first time difference parameter and the second time difference parameter in a same message to the IAB node.

24. The apparatus of claim 22, wherein the first time difference parameter is associated with the first type of alignment and the second time difference parameter is a time offset associated with the second type of alignment, the time offset being relative to the first time difference parameter, wherein the at least one processor is configured to:
transmit the first time difference parameter and the second time difference parameter in separate messages to the IAB node, or
transmit the first time difference parameter and the second time difference parameter in a same message to the IAB node.

25. The apparatus of claim 21, wherein the indication of the time difference parameter comprises a flag corresponding to a type of alignment associated with the time difference parameter.

26. A method of wireless communication at an integrated access and backhaul (IAB) node, comprising:
receiving, from a parent IAB node, a time difference parameter for over-the-air synchronization in an IAB network; and
adjusting transmission or reception timing at the IAB node based on the time difference parameter for one of multiple types of IAB node alignment, wherein the multiple types of the IAB node alignment include: a first type of alignment comprising downlink transmission timing alignment across each IAB node of the IAB network, a second type of alignment between uplink transmission at an IAB mobile termination (IAB-MT) of the IAB node and downlink transmission at an IAB distributed unit (IAB-DU) of the IAB node, and a third type of alignment between downlink reception at the IAB-MT of the IAB node and uplink reception at the IAB-DU of the IAB node.

27. The method of claim 26, wherein the time difference parameter corresponds to a timing delta (Tdelta) based on a time difference between an uplink reception time and a downlink transmission time at the parent IAB node.

28. A method of wireless communication at a parent integrated access and backhaul (IAB) node, comprising:
transmitting or receiving communication with an IAB node that is a child node of the parent IAB node; and
transmitting a time difference parameter for over-the-air synchronization in an IAB network, the time difference parameter being applicable for one of multiple types of IAB node alignment, wherein the multiple types of the IAB node alignment include:
a first type of alignment comprising downlink transmission timing alignment across each IAB node of the IAB network,
a second type of alignment between uplink transmission at an IAB mobile termination (IAB-MT) of the IAB node and downlink transmission at an IAB distributed unit (IAB-DU) of the IAB node, and a third type of alignment between downlink reception at the IAB-MT of the IAB node and uplink reception at the IAB-DU of the IAB node, adjusting transmission or reception timing at the IAB node based on the time difference parameter for one of multiple types of IAB node alignment, wherein the multiple types of the IAB node alignment include: a first type of alignment comprising downlink transmission timing alignment across each IAB node of the IAB network, a second type of alignment between uplink transmission at an IAB mobile termination (IAB-MT) of the IAB node and downlink transmission at an IAB distributed unit (IAB-DU) of the IAB node, and a third type of alignment between downlink reception at the IAB-MT of the IAB node and uplink reception at the IAB-DU of the IAB node.

* * * * *